United States Patent
Kang et al.

(10) Patent No.: US 11,425,781 B2
(45) Date of Patent: Aug. 23, 2022

(54) ELECTRONIC DEVICE FOR PERFORMING SEARCHING AND METHOD FOR OPERATING THE SAME

(71) Applicant: SAMSUNG ELECTRONICS CO., LTD., Suwon-si (KR)

(72) Inventors: Daejun Kang, Suwon-si (KR); Keonyoung Lee, Suwon-si (KR); Dongsuk Jung, Suwon-si (KR); Suyoung Park, Suwon-si (KR); Sunmin Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 66 days.

(21) Appl. No.: 17/062,645

(22) Filed: Oct. 5, 2020

(65) Prior Publication Data

US 2021/0105853 A1    Apr. 8, 2021

(30) Foreign Application Priority Data

Oct. 8, 2019   (KR) .................. 10-2019-0124908

(51) Int. Cl.
*H04W 76/27*    (2018.01)
*H04W 84/04*    (2009.01)
*H04W 88/06*    (2009.01)

(52) U.S. Cl.
CPC .......... *H04W 76/27* (2018.02); *H04W 84/042* (2013.01); *H04W 88/06* (2013.01)

(58) Field of Classification Search
CPC ... H04W 76/27; H04W 84/042; H04W 88/06; H04W 48/16; H04W 48/20; H04W 76/30; H04W 76/50
See application file for complete search history.

(56) References Cited

U.S. PATENT DOCUMENTS

| | | | |
|---|---|---|---|
| 2013/0229955 A1 | 9/2013 | Xu et al. | |
| 2017/0064691 A1 | 3/2017 | Kubota et al. | |
| 2018/0092016 A1 | 3/2018 | Kim et al. | |
| 2018/0270682 A1 | 9/2018 | Zacharias et al. | |
| 2019/0268963 A1 | 8/2019 | Kim et al. | |
| 2020/0280916 A1 | 9/2020 | Tang | |
| 2020/0288338 A1* | 9/2020 | Freda | H04W 24/10 |

FOREIGN PATENT DOCUMENTS

WO    2019/144417    8/2019

OTHER PUBLICATIONS

Search Report and Written Opinion dated Nov. 30, 2020 in counterpart International Patent Application No. PCT/KR2020/012034.

* cited by examiner

*Primary Examiner* — Diane D Mizrahi

(57) ABSTRACT

An electronic device according to various embodiments may include: at least one communication processor configured to support at least one network communication, wherein the at least one communication processor is configured to: enter an inactive state based on detecting an RRC release message after establishing an RRC connection with a first cell and entering a connected state, identify that a service cannot be provided in the inactive state, perform a search until a timer started based on a reception of the RRC release message expires, and maintain the inactive state based on camping-on a selected cell based on a result of the search.

20 Claims, 21 Drawing Sheets

ELECTRONIC DEVICE FOR PERFORMING SEARCHING AND METHOD FOR OPERATING THE SAME

CROSS-REFERENCE TO RELATED APPLICATION

This application is based on and claims priority under 35 U.S.C. § 119 to Korean Patent Application No. 10-2019-0124908, filed on Oct. 8, 2019, in the Korean Intellectual Property Office, the disclosure of which is incorporated by reference herein in its entirety.

BACKGROUND

Field

The disclosure relates to an electronic device for performing searching and a method for operating the same.

Description of Related Art

With the recent development of mobile communication technology, the use of portable terminals having various functions has become common, and efforts are being made to develop a 5G communication system to meet the increasing demand for wireless data traffic. In order to achieve a high data transmission rate, the 5G communication system is considered to be implemented in an ultra-high frequency band in addition to the high frequency band used in a 3G system and an LTE system, to provide a faster data transmission rate.

As a method of implementing 5G communication, a stand-alone (SA) method and a non-stand-alone (NSA) method are considered. Among the methods, the NSA method may include an LTE NR-dual connectivity (EN-DC) method using a new radio (NR) system with an existing LTE system. In the NSA method, the user terminal can use the eNB of the LTE system as well as the gNB of the NR system.

In the 5G NR standard (e.g., 3GPP TS 38.331), an inactive state (e.g., RRC_INACTIVE state) is defined. A user equipment (UE) may operate at a low power in an inactive state as in an idle state (e.g., RRC_IDLE state). In addition, when the UE is changed from an inactive state back to a connected state (e.g., RRC_Connected state), it may be possible to change only through a resume message without delay and/or signaling. In an idle state (e.g., RRC_IDLE state) defined in the LTE standard, only core network (CN) paging may be monitored. In the newly defined deactivation state of 5G (e.g., RRC_INACTIVE state), the movement of the UE may be managed on a radio access network (RAN) basis, and in the inactive state, both RAN paging and CN paging may be monitored. In addition, in the inactive state, the UE can maintain an access stratum (AS) context, so that a connection can be easily formed thereafter.

In the 5G NR standard (e.g., 3GPP TS 38.331), operation in the NR RRC_INACTIVE state is described. However, in the 5G NR standard, when a UE is identified to be out of service, the operation to be performed by the UE is not disclosed. As described above, in the inactive state, the UE may monitor both the RAN paging and the CN paging, and may also maintain the AS context, so it may be more advantageous for the user device to maintain the inactive state for as long as possible.

SUMMARY

Embodiments of the disclosure provide an electronic device and operation method thereof that may perform a search while maintaining an inactive state based on determining that a service is not provided by a serving public land mobile network (PLMN) in an inactive state.

An electronic device according to various example embodiments may include: at least one communication processor configured to support at least one network communication, and the at least one communication processor may be configured to: based on establishing an RRC connection with a first cell and entering the connected state, enter an inactive state based on detecting an RRC release message, and in the inactive state, identify that a service cannot be provided, perform a search until a timer started based on receiving the RRC release message expires, and maintain the inactive state based on camp-on a selected cell based on a result of the search.

A method of operating an electronic device according to various example embodiments may include: based on establishing an RRC connection with a first cell and entering a connected state, and entering an inactive state based on detecting an RRC release message; in the inactive state, identifying that a service cannot be provided; performing a search until a timer started based on receiving the RRC release message expires; and maintaining the inactive state based on camp-on a selected cell based on a result of the search.

According to various example embodiments, there may be provided an electronic device capable of performing a search while maintaining an inactive state based on determining that a service is not provided by a serving public land mobile network (PLMN) in an inactive state, and a method of operating the same. According to camping-on the selected cell, based on the search result, the electronic device may remain inactive for as long as possible.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
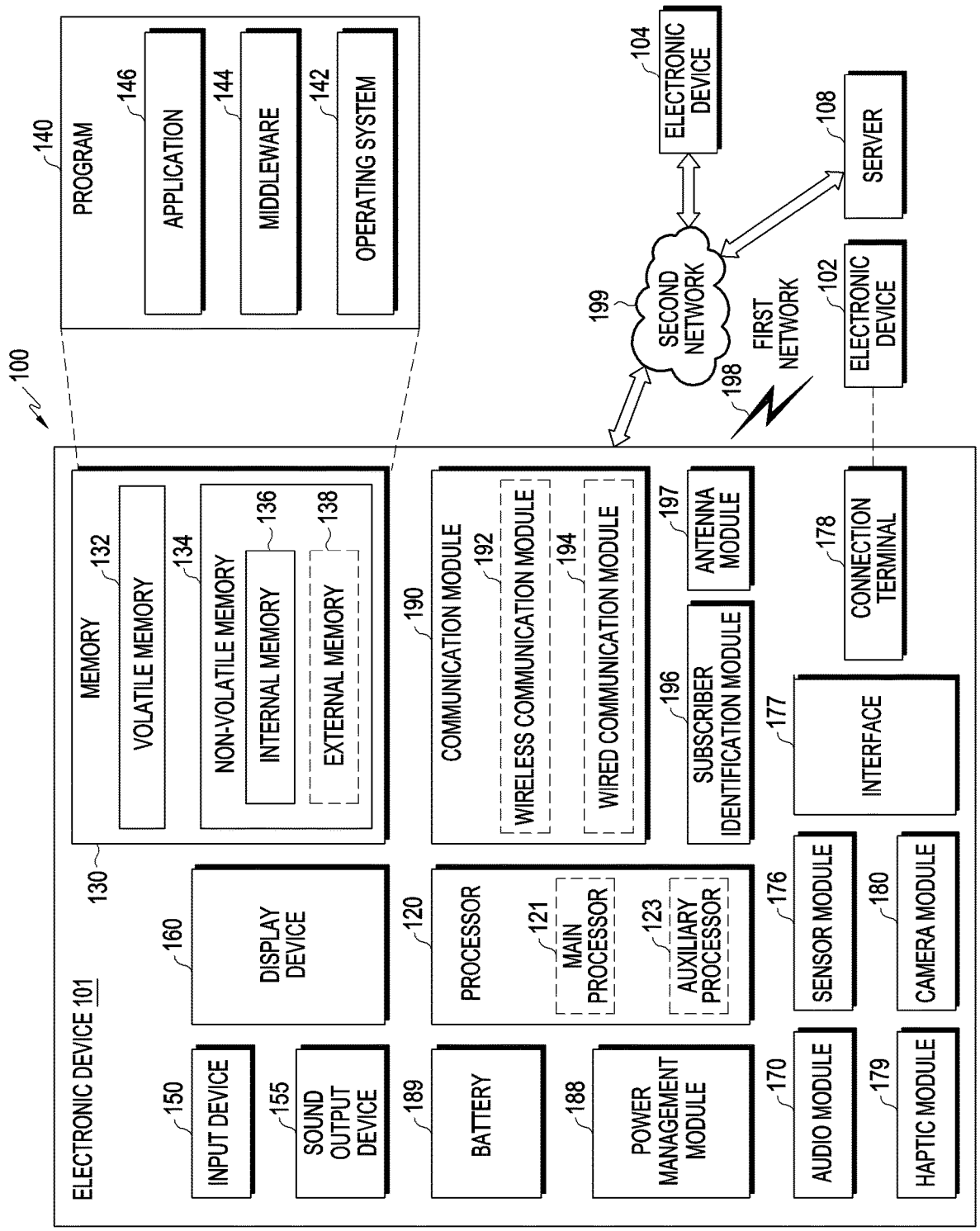
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
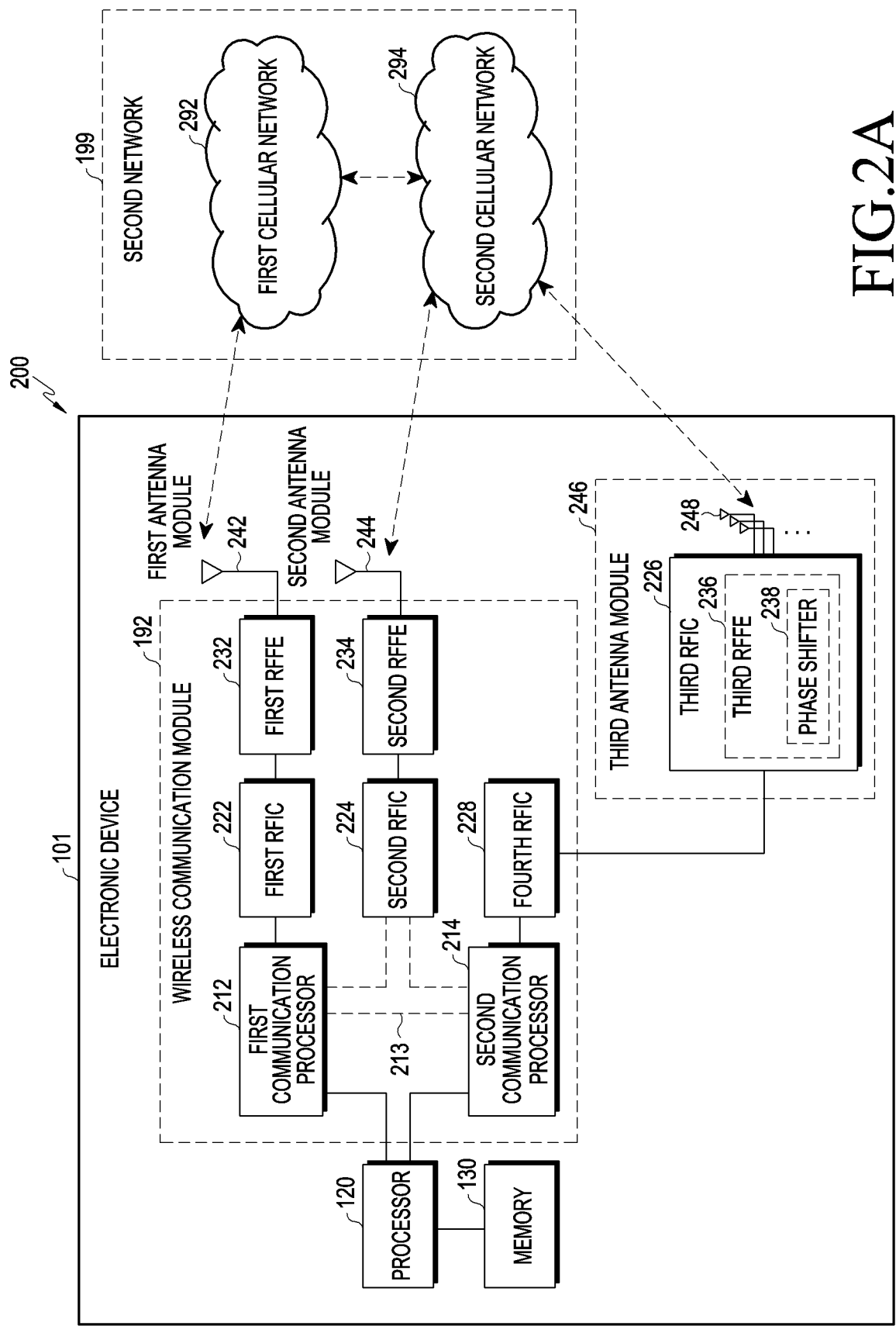
FIG. 2A is a block diagram illustrating an example electronic device supporting network communication and 5G network communication according to various embodiments.

FIG. 2A is a block diagram 200 illustrating an electronic device 101 supporting network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor (e.g., including processing circuitry) 120 and a memory 130. A network 199 may include a first network 292 and a second network 294. According to another embodiment, the electronic device 101 may further include at least one of the components described in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to another embodiment, the fourth RFIC 228 may be omitted, or may be included as part of the third RFIC 226.

The first communication processor 212 may include various processing circuitry and support establishment of a communication channel in a band to be used for wireless communication with the first network 292 and legacy network communication through the established communication channel. According to various embodiments, the first network may be a legacy network including a second generation (2G), 3G, 4G, or long term evolution (LTE) network. The second communication processor 214 may include various processing circuitry and support establishment of a communication channel corresponding to a designated band (e.g., about 6 GHz to about 60 GHz) among bands to be used for wireless communication with the second network 294 and 5G network communication through the established communication channel. According to various embodiments, the second network 294 may be a 5G network defined by 3GPP. Additionally, according to an embodiment, the first communication processor 212 or the second communication processor 214 may support establishment of a communication channel corresponding to another designated band (e.g., about 6 GHz or less) among bands to be used for wireless communication with the second network 294 and 5G network communication through the established communication channel.

The first communication processor 212 may transmit and receive data to and from the second communication processor 214. For example, data classified to be transmitted through a second cellular network 294 may be changed to be transmitted through a first cellular network 292. In this case, the first communication processor 212 may receive transmission data from the second communication processor 214.

For example, the first communication processor 212 may transmit and receive data to and from the second communication processor 214 via an inter-processor interface 213. The inter-processor interface 213 may be implemented with, for example, a universal asynchronous receiver/transmitter (UART) (e.g., high speed-UART (HS-UART) or peripheral component interconnect bus express (PCIe) interface), but there is no limit on the type. The first communication processor 212 and the second communication processor 214 may exchange control information and packet data information using, for example, a shared memory. The first communication processor 212 may transmit and receive various information, such as sensing information, information about output intensity, and resource block (RB) allocation information, to and from the second communication processor 214.

Depending on the implementation, the first communication processor 212 might not be directly connected to the second communication processor 214. In this case, the first communication processor 212 may transmit and receive data through and the processor 120 (e.g., an application processor) to and from the second communication processor 214. For example, the first communication processor 212 and the second communication processor 214 may transmit and receive data to and from the processor 120 (e.g., application processor) through the HS-UART interface or PCIe interface, but there is no limit on the type of interface. Alternatively, the first communication processor 212 and the second communication processor 214 may exchange control information and packet data information with the processor 120 (e.g., an application processor) using the shared memory.

Figure 2B:
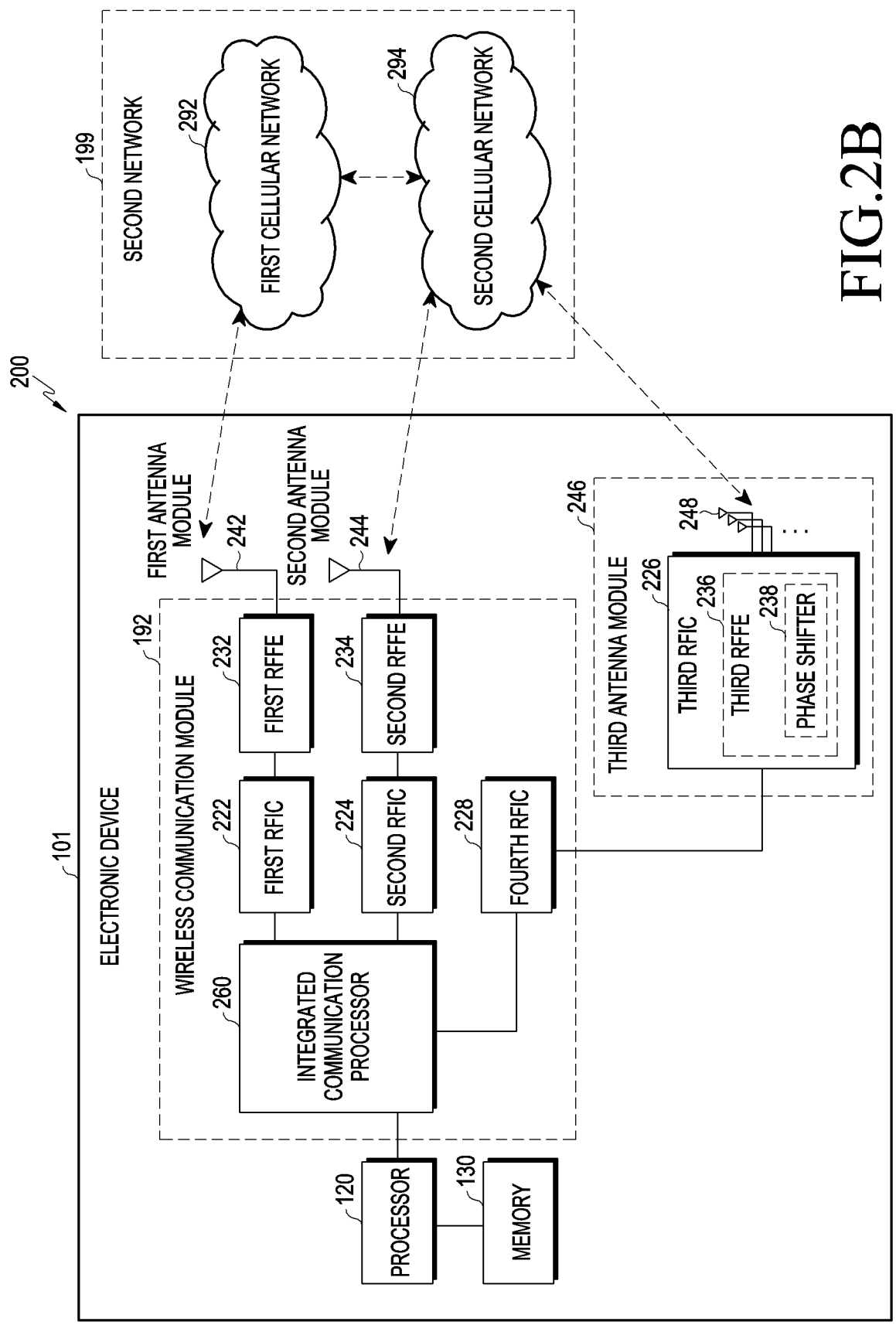
FIG. 2B is a block diagram illustrating an example electronic device supporting network communication and 5G network communication according to various embodiments.

According to an embodiment, the first communication processor 212 and the second communication processor 214 may be implemented in a single chip or a single package. According to various embodiments, the first communication processor 212 or the second communication processor 214 may be in the form of a single chip or a single package with the processor 120, the coprocessor 123, or the communication module 190. For example, as illustrated in FIG. 2B, the unified communication processor (e.g., including processing circuitry) 260 may support all functions for communication with the first cellular network and the second cellular network.

The first RFIC 222, when transmitting, may convert a baseband signal generated by the first communication processor 212 into a radio frequency (RF) signal of about 700 MHz to about 3 GHz used in the first network 292 (e.g., legacy network). When receiving, an RF signal is obtained from the first network 292 (e.g., legacy network) through an antenna (e.g., first antenna module 242), and may be pre-processed through RFFE (e.g., first RFFE 232). The first RFIC 222 may convert the preprocessed RF signal into a baseband signal so that it may be processed by the first communication processor 212.

The second RFIC 224, when transmitting, may convert the baseband signal generated by the first communication processor 212 or the second communication processor 214 into an RF signal (hereinafter, 5G Sub6 RF signal) of a Sub6 band (e.g., about 6 GHz or less) used in the second network 294 (e.g., a 5G network). When receiving, the 5G Sub6 RF signal is obtained from the second network 294 (e.g., a 5G network) through an antenna (e.g., second antenna module 244), and may be pre-processed via RFFE (e.g., second RFFE 234). The second RFIC 224 may convert the pre-processed 5G Sub6 RF signal into a baseband signal to be processed by a corresponding communication processor among the first communication processor 212 or the second communication processor 214.

The third RFIC 226 may convert the baseband signal generated by the second communication processor 214 into an RF signal (hereinafter, 5G Above6 RF signal) in the 5G Above6 band (e.g., about 6 GHz to about 60 GHz) to be used in the second network 294 (e.g., 5G network). When receiving, the 5G Above6 RF signal may be obtained from the second network 294 (e.g., 5G network) through an antenna (e.g., antenna 248) and may be pre-processed through a third RFFE 236. The third RFIC 226 may convert the pre-processed 5G Above6 RF signal into a baseband signal to be processed by the second communication processor 214. According to an embodiment, the third RFFE 236 may be formed as a part of the third RFIC 226.

The electronic device 101 may include the fourth RFIC 228 separately or at least as a part of the third RFIC 226 according to an embodiment. In this case, the fourth RFIC 228 may convert the baseband signal generated by the second communication processor 214 into an RF signal (hereinafter, IF signal) of an intermediate frequency band (e.g., about 9 GHz to about 11 GHz), and then may transfer the IF signal to the third RFIC 226. The third RFIC 226 may convert the IF signal into a 5G Above6 RF signal. When receiving, a 5G Above6 RF signal may be received from the second network 294 (e.g., 5G network) through an antenna (e.g., antenna 248) and converted into an IF signal by a third RFIC 226. The fourth RFIC 228 may convert the IF signal into a baseband signal for being processed by the second communication processor 214.

According to an embodiment, the first RFIC 222 and the second RFIC 224 may be implemented as a single chip or at least a part of a single package. According to an embodiment, the first RFFE 232 and the second RFFE 234 may be implemented as a single chip or at least a part of a single package. According to an embodiment, at least one antenna module of the first antenna module 242 or the second antenna module 244 may be omitted or combined with another antenna module to process RF signals of a plurality of corresponding bands.

According to an embodiment, the third RFIC 226 and the antenna 248 may be disposed on the same substrate to form the third antenna module 246. For example, the wireless communication module 192 or the processor 120 may be disposed on a first substrate (e.g., main PCB). In this case, the third RFIC 226 may be disposed in some area (e.g., the lower surface) of a second substrate (e.g., sub PCB) separated from the first substrate, and the antenna 248 may be disposed in another area (e.g., upper surface) from the third antenna module 246. By arranging the third RFIC 226 and the antenna 248 in the same substrate, it is possible to reduce the length of the transmission line therebetween. This can reduce, for example, a signal in a high frequency band (e.g., about 6 GHz to about 60 GHz) used for 5G network communication to be lost (e.g., attenuated) by a transmission line. As a result, the electronic device 101 can improve the quality or speed of communication with the second network 294 (e.g., a 5G network).

According to an embodiment, the antenna 248 may include an antenna array including a plurality of antenna elements that may be used for beamforming. In this case, the third RFIC 226 may include a plurality of phase shifters 238 corresponding to a plurality of antenna elements, for example, as part of the third RFFE 236. When transmitting, each of the plurality of phase shifters 238 may convert the phase of the 5G Above6 RF signal to be transmitted to the outside of the electronic device 101 (e.g., a base station of a 5G network) through a corresponding antenna element. When receiving, each of the plurality of phase shifters 238 may convert the phase of the 5G Above6 RF signal received from the outside to the same or substantially the same phase through a corresponding antenna element. This enables transmission or reception through beamforming between the electronic device 101 and the outside.

The second network 294 (e.g., 5G network) may be operated independently of the first network 292 (e.g., legacy network) (e.g., stand-alone (SA)), or may be connected and operated (e.g., non-stand-alone (NSA)). For example, a 5G network may have only an access network (e.g., 5G radio access network (RAN) or next generation RAN (NG RAN)), and no core network (e.g., next generation core (NGC)). In this case, the electronic device 101 may access the access network of the 5G network, and then access the external network (e.g., the Internet) under the control of the core network (e.g., evolved packed core (EPC)) of the legacy network. Protocol information (e.g., LTE protocol information) for communication with a legacy network or protocol information (e.g., new radio (NR) protocol information) for communication with a 5G network may be stored in the memory 230, and may be accessed by other parts (e.g., a processor 120, the first communication processor 212, or the second communication processor 214).

Figure 3:
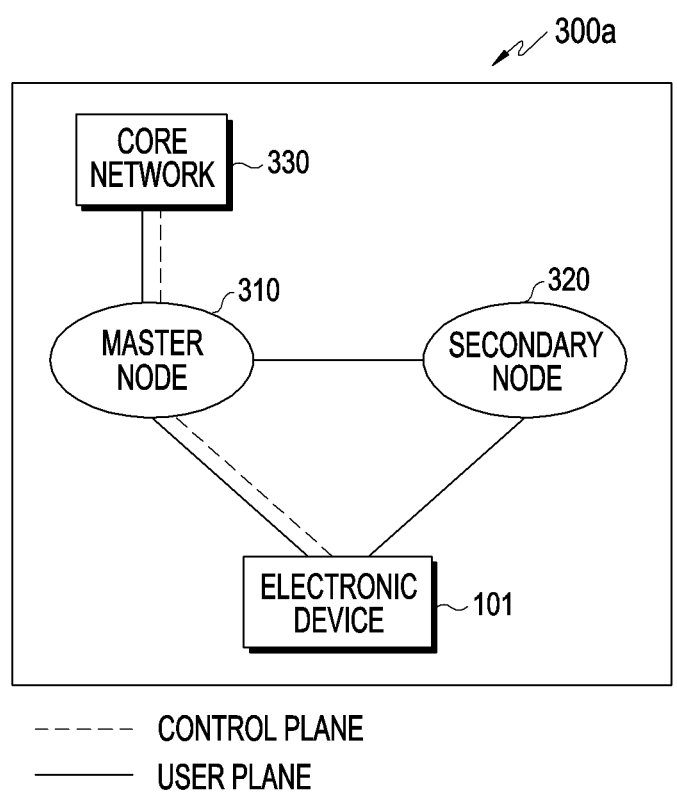
FIG. 3 is a diagram illustrating example wireless communication systems providing a network of legacy communication and/or 5G communication according to various embodiments.
Figure 4:
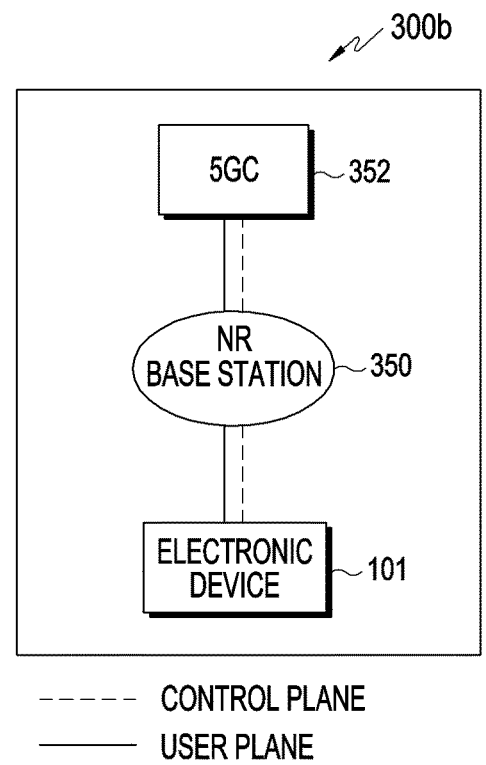
FIG. 4 is a diagram illustrating an example bearer in a UE according to various embodiments.

FIG. 3 is a diagram illustrating example wireless communication systems providing a network of legacy communication and/or 5G communication according to various embodiments, and FIG. 4 is a diagram illustrating example wireless communication systems providing a network of legacy communication and/or 5G communication according to various embodiments.

Referring to FIG. 3, the network environment 300a may include at least one of a legacy network and a 5G network. The legacy network may include, for example, a 3GPP standard 4G or LTE base station 310 (e.g., an eNode B (eNB)) supporting wireless connection with the electronic device 101 and an evolved packet core (EPC) that manages 4G communication. The 5G network may include, for example, a new radio (NR) base station 350 (e.g., gNodeB (gNB)) supporting wireless connection with the electronic device 101 and a 5th generation core (5GC) 352 which manages 5G communication of the electronic device 101.

According to various embodiments, the electronic device 101 may transmit and receive a control message and user data via legacy communication and/or 5G communication. The control message may include, for example, a message related to at least one of security control, bearer setup, authentication, registration, or mobility management of the electronic device 101. The user data may refer, for example, to user data excluding control messages transmitted and received between the electronic device 101 and the core network 330 (e.g., EPC or 5GC).

Referring to FIG. 3, the electronic device 101 according to an embodiment may transmit and receive at least one of a control message or user data with at least a part of a 5G network (e.g., NR base station, 5GC) using at least a part of a legacy network (e.g., LTE base station, EPC).

According to various embodiments, the network environment 300a may provide wireless communication dual connectivity (DC) to the LTE base station and the NR base station, and may include a network environment for transmitting and receiving a control message with the electronic device 101 through the core network 330 of either EPC or 5GC.

According to various embodiments, in a DC environment, one of the LTE base station or the NR base station may operate as a master node (MN) 310 and the other as a secondary node (SN) 320. The MN 310 may be connected to the core network 330 to transmit and receive control messages. The MN 310 and the SN 320 may be connected through a network interface to transmit and receive messages related to radio resource (e.g., communication channel) management.

According to various embodiments, the MN 310 may be configured as an LTE base station 310, an SN 320 as an NR base station, and a core network 330 as an EPC. For example, a control message may be transmitted and received through an LTE base station and an EPC, and user data may be transmitted and received through at least one of an LTE base station or an NR base station.

According to various embodiments, the MN 310 may be configured as an NR base station, an SN 320 as an LTE base station, and a core network 330 as 5GC. For example, a control message may be transmitted and received through an NR base station and 5GC, and user data may be transmitted and received through at least one of an LTE base station or an NR base station.

According to various embodiments, the electronic device 101 may be registered with at least one of EPC or 5GC to transmit and receive control messages.

According to various embodiments, the EPC or 5GC may manage communication of the electronic device 101 by interworking. For example, movement information of the electronic device 101 may be transmitted and received through the interface between the EPC and 5GC.

As described above, dual connectivity through an LTE base station and an NR base station may be referred to as E-UTRA new radio dual connectivity (EN-DC). Meanwhile, MR DC may be variously applied in addition to EN-DC.

For example, the first network and the second network by MR DC are all related to LTE communication, and the second network may be a network corresponding to a small-cell of a specific frequency. For example, the first network and the second network by MR DC are all related to 5G, the first network may correspond to a frequency band below 6 GHz (e.g., below 6), and the second network may correspond to a frequency band equal to or higher than 6 GHz (e.g., over 6). In addition to the above-described examples, those skilled in the art will readily understand that if the network structure to which dual connectivity is applicable, the network structure can be applied to various embodiments. Referring to FIG. 4, according to various embodiments, a 5G network may include an NR base station 350 and a 5GC 352, and may independently transmit and receive control messages and user data with the electronic device 101. As shown in FIG. 4, the electronic device 101 may perform 5G communication in a standalone (SA) mode.

Figure 5:
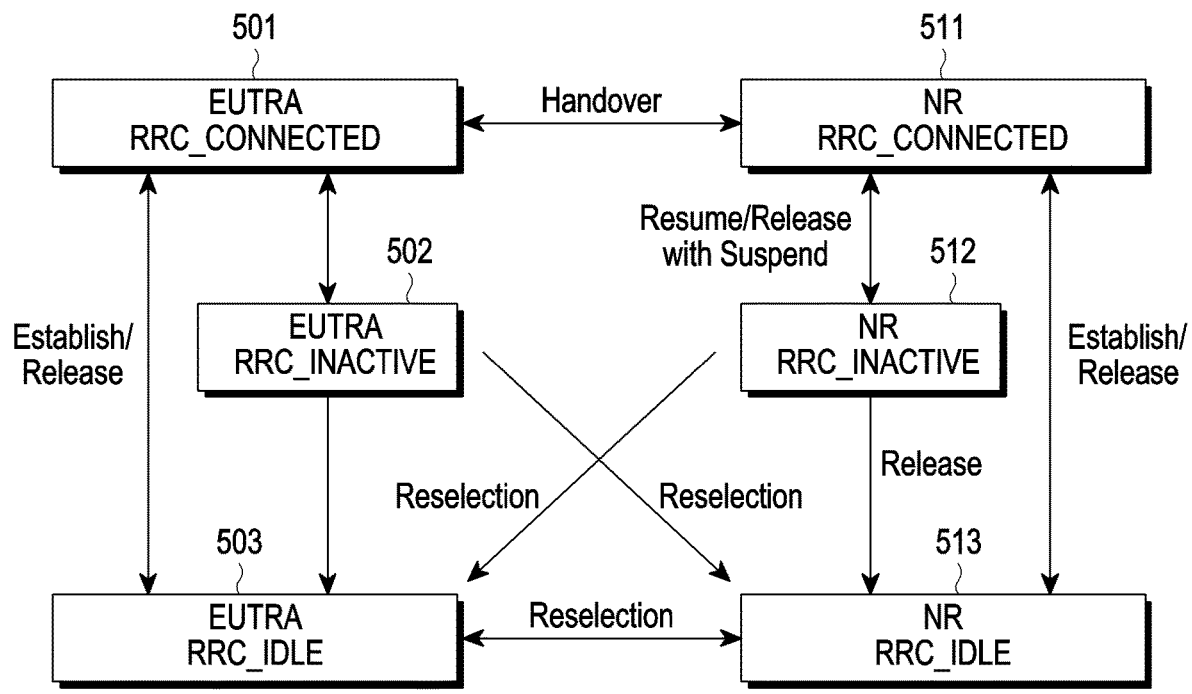
FIG. 5 is a diagram illustrating example state change of an electronic device according to various embodiments.

FIG. 5 is a diagram illustrating an example change in a state (e.g., RRC state) of an electronic device according to various embodiments.

According to various embodiments, the state of the electronic device 101 may be at least one of various states (e.g., RRC states) of FIG. 5. When the state of the electronic device 101 is an arbitrary state, the electronic device 101 may be expressed as being in an arbitrary state. In addition, when the state of the electronic device 101 is changed from the first state to the second state, it may be expressed that the state of the electronic device 101 has been changed, or it may be expressed that the electronic device 101 has changed.

According to various embodiments, when an RRC connection has been established, the electronic device 101 may be in either the RRC_CONNECTED state or the RRC_INACTIVE state. The RRC_CONNECTED state may be, for example, an RRC_CONNECTED state defined in 3GPP TS 38.331, and may be referred to as a connected state in various embodiments. The connected state may include, for example, EUTRA RRC_CONNECTED state 501 and/or NR RRC_CONNECTED state 511. The RRC_INACTIVE state may be, for example, an RRC_INACTIVE state defined in 3GPP TS 38.331, and may be referred to as an inactive state in various embodiments. The inactive state may include, for example, EUTRA RRC_INACTIVE state 502 and/or NR RRC_INACTIVE state 512. If the RRC connection has not been established, the electronic device 101 may be in the RRC_IDLE state. The RRC_IDLE state may be an RRC_IDLE state defined in 3GPP TS 38.331, for example, and may be referred to as an idle state in various embodiments. The idle state may include, for example, EUTRA RRC_IDLE state 503 and/or NR RRC_IDLE state 513.

According to various embodiments, the electronic device 101 may monitor a short message transmitted with a paging radio network temporary identifier (P-RNTI) through a downlink control indicator (DCI) in an idle state. In the idle state, the electronic device 101 may monitor a paging channel for CN paging using a 5G-S-temporary mobile subscriber identity (5G-S-TSMI). In the idle state, the electronic device 101 may perform neighboring cell measurements and cell selection (or cell re-selection). In the idle state, the electronic device 101 may obtain system information (SI), and if set, may transmit a system information request (SI request).

According to various embodiments, in the inactive state, the electronic device 101 may monitor a short message transmitted with a paging radio network temporary identifier (P-RNTI) through a downlink control indicator (DCI). In the inactive state, the electronic device 101 may monitor a paging channel for radio access network (RAN) paging using full I-RNTI and CN paging using 5G-S-temporary mobile subscriber identity (5G-S-TSMI). In the inactive state, the electronic device 101 may perform neighboring cell measurements and cell selection (or cell re-selection). In the inactive state, the electronic device 101 may perform a RAN-based notification area update periodically and when moving out of a set RAN-based notification area.

According to various embodiments, in a connected state, the electronic device 101 may store an AS context. In the connected state, the electronic device 101 may monitor a short message transmitted with a paging radio network temporary identifier (P-RNTI) through a downlink control indicator (DCI). In the connected state, the electronic device 101 may monitor a control channel associated with the shared data channel to determine whether data is scheduled for the electronic device 101. In the connected state, the electronic device 101 may provide channel quality and feedback information. In the connected state, the electronic device 101 may perform a neighboring cell measurement and measurement report. In the connected state, the electronic device 101 can obtain system information.

According to various embodiments, the electronic device 101 may change to the EUTRA RRC_CONNECTED state 501 as the RRC connection is established in the EUTRA RRC_IDLE state 503, and may change to the NR RRC_CONNECTED state 511 as the RRC connection is established in the NR RRC_IDLE state 513. The electronic device 101 may change to the EUTRA RRC_IDLE state 503 as the RRC connection is released from the EUTRA RRC_CONNECTED state 501, and may change to the NR RRC_IDLE state 513 as the RRC connection is released from the NR RRC_CONNECTED state 511. For example, the electronic device 101 may change to the idle state, based on receiving the RRC release message. The electronic device 101 may change from the EUTRA RRC_IDLE state 503 to the NR RRC_IDLE state 513 according to cell reselection or vice versa.

According to various embodiments, the electronic device 101 may change to the NR RRC_INACTIVE state 512 as the RRC connection is released with suspension in the NR RRC_CONNECTED state 511. For example, the electronic device 101 may enter the NR RRC_INACTIVE state 512, based on receiving an RRC Release message including a suspension configuration (e.g., suspendConfig of 3GPP TS 38.331). The electronic device 101 may indicate the suspension of RRC connection to upper layers, for example, based on receiving an RRC Release message including a suspension configuration, and may start a timer (e.g., T380 timer of 3GPP TS 38.331) with a timer value configured according to T380 of the RRC release message. The timer will be described later. The electronic device 101 may change from the NR RRC_INACTIVE state 512 to the NR RRC_CONNECTED state 511, which may be referred to as the resumption of a suspended RRC connection. For example, the electronic device 101 may request the resumption of the RRC connection, and the network may resume the suspended RRC connection and transmit the same to the electronic device 101 in the RRC_CONNECTED state. The electronic device 101 may change from the NR RRC_INACTIVE state 512 to the NR RRC_IDLE state 513. For example, as described above, when requesting to resume the RRC connection, the network may reject the request, release the RRC connection, change the electronic device 101 to the RRC_IDLE state, and may instruct to destroy the stored context and start NAS level recovery. Alternatively, the electronic device 101 may attempt to change from the NR RRC_INACTIVE state 512 to the NR RRC_IDLE state 513 by itself. Meanwhile, the electronic device 101 may change from the EUTRA RRC_CONNECTED state 501 to the EUTRA RRC_INACTIVE state 502, or vice versa. The electronic device 101 may change from the EUTRA RRC_INACTIVE state 502 to the EUTRA RRC_IDLE state 503.

According to various embodiments, the electronic device 101 may change from the EUTRA RRC_CONNECTED state 501 to the NR RRC_CONNECTED state 511 through handover, or vice versa. The electronic device 101 may change from the NR RRC_INACTIVE state 512 to the EUTRA RRC_IDLE state 503 according to the cell reselection, or from the EUTRA RRC_INACTIVE state 502 to the NR RRC_IDLE state 513.

Figure 6A:
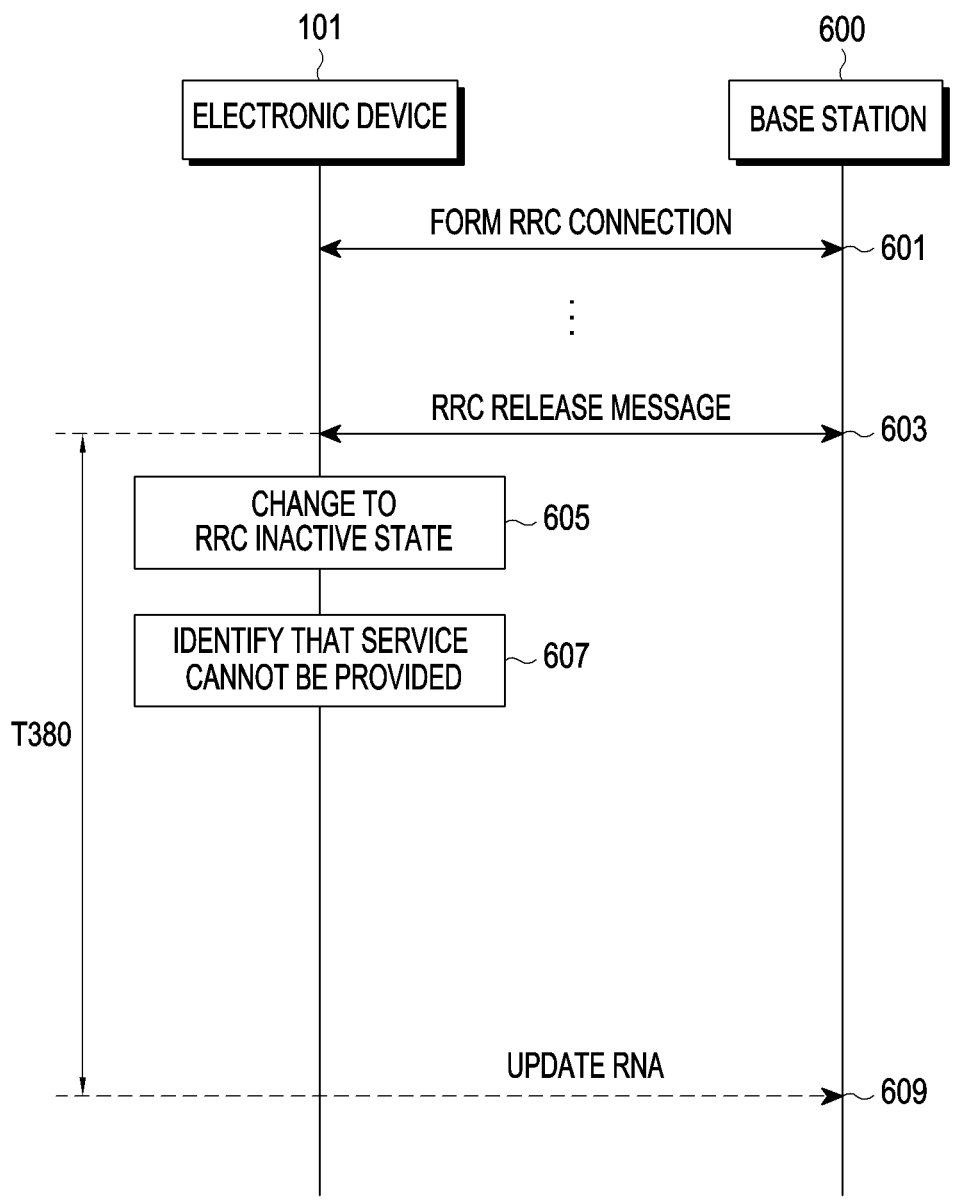
FIG. 6A is a signal flow diagram illustrating an example method of operating an electronic device and a base station according to a comparative example for comparison with various embodiments.
Figure 6B:
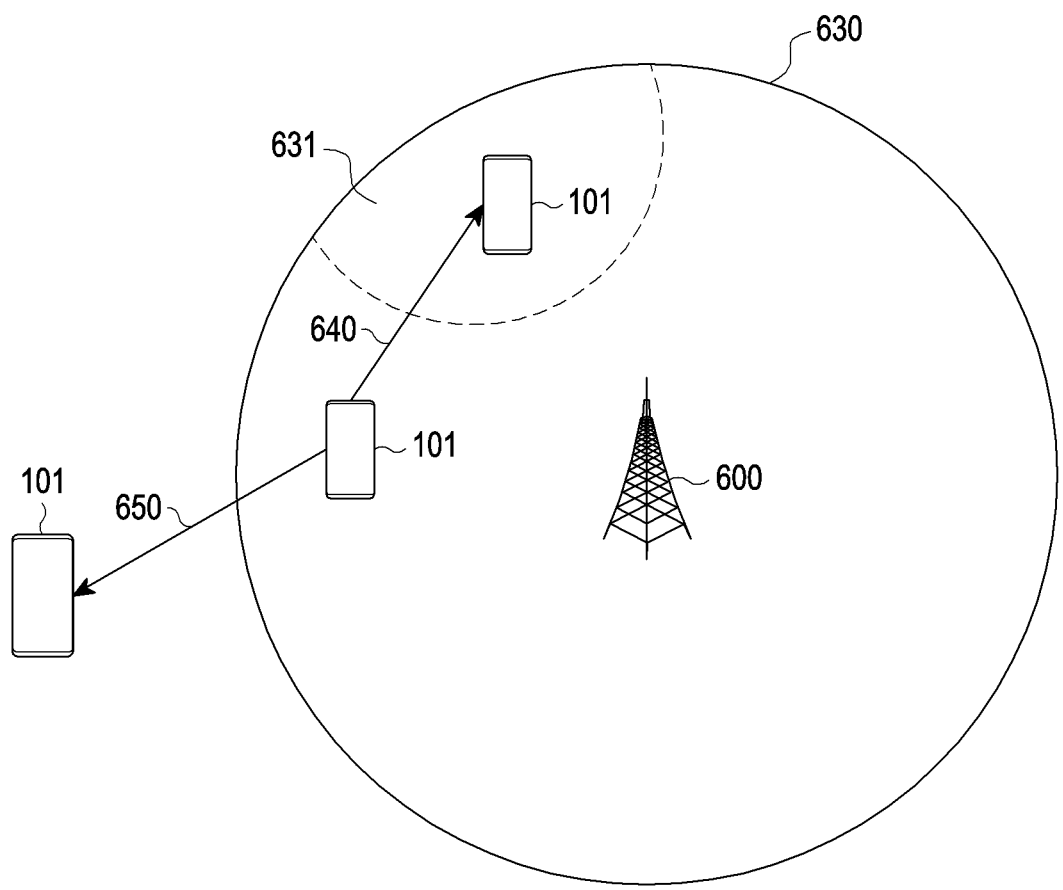
FIG. 6B is a diagram illustrating example locations of the base station and the electronic device according to various embodiments.

FIG. 6A is a signal flow diagram illustrating an example method of operating an electronic device and a base station according to a comparative example for comparison with various embodiments. The comparative example of FIG. 6A will be described with reference to FIG. 6B. FIG. 6B is a diagram illustrating example locations of the base station and the electronic device. Those skilled in the art will understand that at least one operation of the comparative example may be performed by the electronic device 101 according to various embodiments.

According to a comparative example, the electronic device 101 (e.g., at least one of the processor 120, the first communication processor 212, the second communication processor 214, or the unified communication processor 260), may establish an RRC connection with the base station 600 in operation 601. The base station 600 may, for example, be a base station corresponding to a serving PLMN, and the electronic device 101 may establish an RRC connection with the base station 600 based on performing an RRC connection procedure. The base station 600 may be a base station supporting first network communication (e.g., NR communication), and may be referred to as a serving cell, for example. After the RRC connection is established, the electronic device 101 may enter a connection state (e.g., NR RRC_CONNECTED state).

According to a comparative example, the electronic device 101 may receive an RRC release message from the base station 600 in operation 603. The RRC release message may include a grace setting (e.g., suspendConfig of 3GPP TS 38.331). The electronic device 101 may change the state of the electronic device 101 from the connected state to the inactive state (e.g., NR RRC_INACTIVE state) in operation 605, based on the reception of the RRC release message including the grace setting. The electronic device 101 may start a timer (e.g., a T380 timer of 3GPP TS 38.331) with a timer value set according to T380 of the RRC release message. The electronic device 101 may be configured to perform a RAN based notification area (RNA) update when the T380 timer expires. T380 may be set to, for example, min5, min10, etc., which may refer, for example, to 5 minutes and 10 minutes, respectively.

According to the comparative example, the electronic device 101 may identify out of service in operation 607. For example, the electronic device 101 may identify that service provision corresponding to the serving PLMN is impossible. As shown in FIG. 6B, the electronic device 101 may move 640 to a service unavailable area 631 in the coverage 630 of the base station 600. The electronic device 101 may move 640 out of the coverage 630 of the base station 600. In the out of service area 631 or outside the coverage 630, the electronic device 101 may identify that the signal from the serving cell (e.g., the base station 600) corresponds to a service being unavailable. If it is not identified that the service cannot be provided, the electronic device 101 may perform an RNA update in operation 609, for example. The base station 600 (or the network corresponding to the base station 600) may manage the electronic device 101 to be in an inactive state until an RNA update is received. The electronic device 101 remains inactive until the RNA update is performed, and additionally, it may be requested to perform an operation for maintaining the inactive state. The electronic device 101 according to various embodiments may perform a search to maintain an inactive state before performing an RNA update, for example, before the T380 timer expires, which will be described with reference to FIG. 7.

Figure 7:
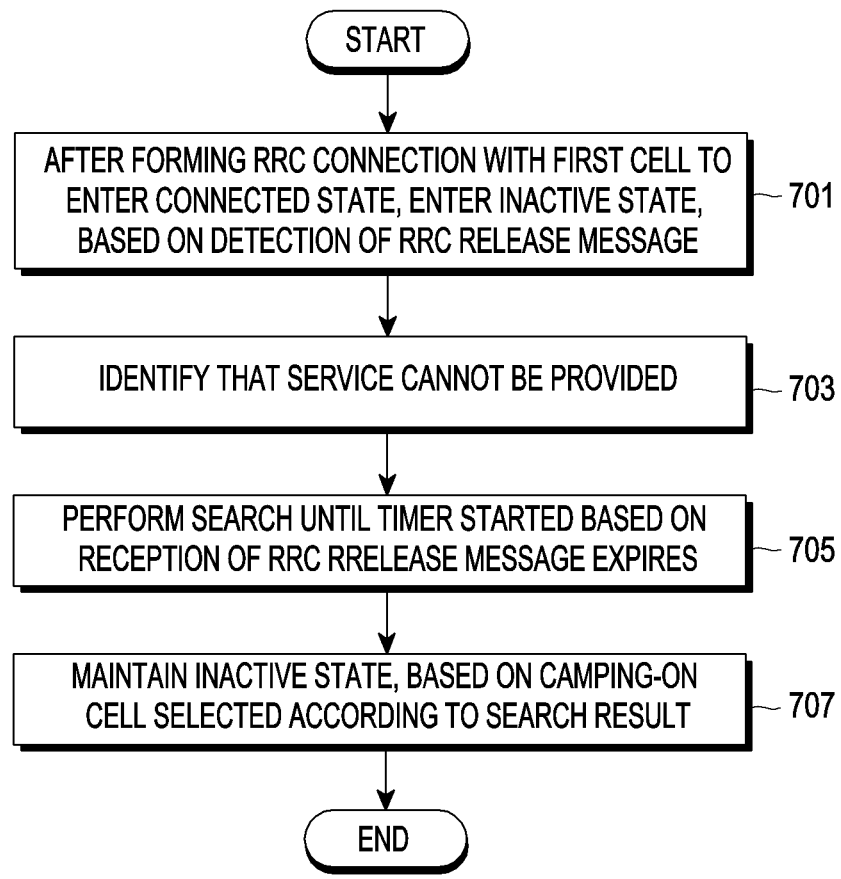
FIG. 7 is a flowchart illustrating an example method of operating an electronic device according to various embodiments.

FIG. 7 is a flowchart illustrating an example method of operating an electronic device according to various embodiments.

According to various embodiments, the electronic device 101 (e.g., at least one of the processor 120, the first communication processor 212, the second communication processor 214, or the unified communication processor 260) may enter the inactive state, based on detecting the RRC release message, after establishing an RRC connection with the first cell in operation 701 and entering the connected state. The electronic device 101 may establish an RRC connection with a first cell (e.g., a cell corresponding to an NR communication network). The electronic device 101 may enter a connected state (e.g., NR RRC_CONNECTED state), based on the RRC connection between the electronic device 101 and the first cell. The electronic device 101 may receive an RRC release message to release the RRC connection from the first cell. The RRC release message may include a suspension configuration, and the electronic device 101 may enter an inactive state (e.g., NR RRC_INACTIVE state) upon identification of the suspension configuration.

The electronic device 101 may camp-on a cell (e.g., a first cell or another cell) in an inactive state.

According to various embodiments of the disclosure, in the inactive state, the electronic device 101 may identify that the service cannot be provided in operation 703. The electronic device 101 may identify that the service cannot be provided, for example, by identifying the provision of a no service indication from an access stratum (AS) to a non-access stratum (NAS). The conditions indicating the inability to provide the service are merely examples and are not limited.

For example, the electronic device 101 may measure a signal from the camp-on cell. In the disclosure, measurement of a signal may refer, for example, to measuring a reception characteristic (e.g., RSRP, RSRQ, SINR, and/or RSSI) of the signal, for example. The electronic device 101 may identify that the measurement result of the signal from the camp-on serving cell fails to satisfy the condition. For example, in the inactive state, the electronic device 101 may move to the out of service area 631 as shown in FIG. 6B, or may move out of the coverage 630 of the serving cell (e.g., the base station 600). In this case, the electronic device 101 may identify that the measurement result of the signal from the serving cell fails to satisfy the specified condition. For example, the electronic device 101 may identify that RSRP and RSRQ of the signal from a camp-on serving cell fail a cell selection condition (e.g., cell selection criterion S of 3GPP TS 38.304 or 3GPP TS 38.133).

For example, the electronic device 101 may search for a new suitable cell for a specified search period (e.g., 10 seconds). The electronic device 101 may perform a search, for example, using intra-frequency, inter-frequency, and inter-RAT information specified in system information. For example, the search may include at least one of measurement, evaluation, or detection. If the search for the suitable cell fails during the search period, the electronic device 101 may identify that service provision for the corresponding PLMN is not possible. Based on the failure of the search for a new suitable cell, an indicator for not providing a service from the AS to the NAS may be provided, and the electronic device 101 may identify that the service is not available. The above-described operation is merely an example, and the electronic device 101 may immediately identify that the service cannot be provided, for example, based on the failure of the signal from the serving cell to satisfy the specified condition (e.g., cell selection condition).

According to various embodiments, the electronic device 101 may perform a search until the timer started based on the reception of the RRC release message in operation 705 expires. As described above, the electronic device 101 may start the T380 timer with a timer value set according to T380 included in the RRC release message. The T380 timer may be started based on the reception of T380 in the RRC release message, for example. The T380 timer may be stopped based on the reception of an RRC Resume message, an RRC setup message, or an RRC release message, for example. When the T380 timer expires, the electronic device 101 may perform an operation (e.g., RNA update), based on 5.3.13 of 3GPP TS 38.311. In various embodiments, the RRC release message may include ran-Notificationareainfo. In operation 707, the electronic device 101 may maintain an inactive state based on camp-on on the selected cell according to the search results. For example, the electronic device 101 may perform a search for the same RAT as the camped-on cell before it is determined that service provision is impossible. For example, the electronic device 101 may perform a search for a plurality of RATs. For example, the electronic device 101 may first perform a search for the same RAT as the camped-on cell before it is determined that service is not available, and then perform a search for a plurality of RATs. When the cell is selected according to the search result, the electronic device 101 may camp-on the selected cell and maintain an inactive state. The electronic device 101 may transmit an RRC resume request for synchronization with the network. The cause of the RRC resumption request may be set as an RNA update.

According to various embodiments of the disclosure, when it is determined that service provision is impossible or cannot be provided in the inactive state, the electronic device 101 may maintain the inactive state without considering a timer (e.g., a T380 timer) and transmitting a message to the network. In addition, as the electronic device 101 has no service, an RRC state mismatch between the network and the electronic device 101 can be prevented from occurring.

Figure 8:
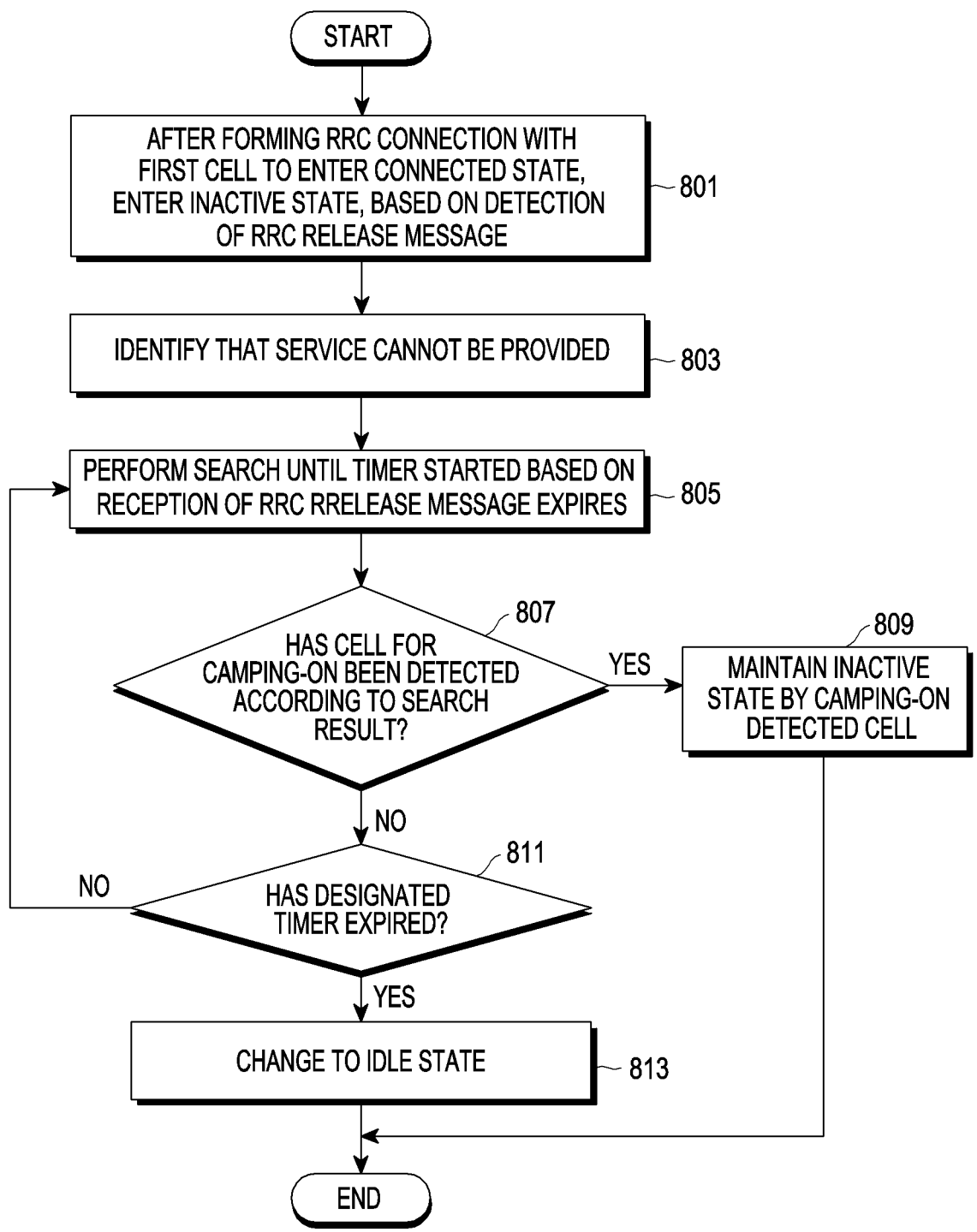
FIG. 8 is a flowchart illustrating an example method of operating an electronic device according to various embodiments.

FIG. 8 is a flowchart illustrating an example method of operating an electronic device according to various embodiments. The operation previously described and included in FIG. 8 will be briefly mentioned.

According to various embodiments, the electronic device 101 (e.g., at least one of the processor 120, the first communication processor 212, the second communication processor 214, or the unified communication processor 260) may, in operation 801, enter an inactive state based on detecting an RRC release message after entering the connected state by forming an RRC connection with the first cell. The RRC release message may include a suspension configuration (e.g., suspended config), and the electronic device 101 may enter an inactive state, based on the suspension configuration. In an inactive state, the electronic device 101 may camp-on the first cell or another cell. In operation 803, the electronic device 101 may identify that the service cannot be provided. For example, the electronic device 101 may check a no service indicator from the AS. In operation 805, the electronic device 101 may perform a search until a timer (e.g., T380 timer) started based on the reception of the RRC release message expires.

According to various embodiments, in operation 807, the electronic device 101 may identify whether a cell for camping-on is detected according to the search results. The electronic device 101 may identify whether a suitable cell and/or an acceptable cell are detected, for example. The electronic device 101 may perform a search for the same RAT as the RAT of the cell that has been camped on in an inactive state, for example. The electronic device 101 may perform a search for a plurality of RATs including RATs of cells that have been camped on in an inactive state. If a cell for camping-on is detected (807—YES), the electronic device 101 may maintain the inactive state by camping-on the cell detected in operation 809. In various embodiments, the electronic device 101 may transmit an RRC resume request for synchronization with the network, in which case the cause may be set to RNA-update.

According to various embodiments, if a cell for camping-on is not detected (807—No), the electronic device 101 may determine whether a timer (e.g., T380 timer) specified in operation 811 has expired. If the specified timer has not expired (811—No), the electronic device 101 may perform a search until the timer (e.g., T380 timer), started based on the reception of the RRC release message, expires. When the designated timer expires (811—YES), the electronic device 101 may change to the idle state in operation 813. In various embodiments, the electronic device 101 may perform a limited search in the idle state. The limited search may refer, for example, to searching so that an acceptable cell that does not satisfy the conditions of a suitable cell may be camped on. In the limited search process, the AS may change the RRC state from the RRC inactive state to the RRC idle state. For example, the AS may notify the NAS of the expiration of the T380 timer, and the NAS may identify a limited service. The NAS may announce a limited search to the AS, and the AS may perform a limited search. The electronic device 101 may search for an acceptable cell, based on, for example, limited search results, and camp-on the acceptable cell. As described above, the inactive state may be maintained until the T380 timer expires.

Figure 9A:
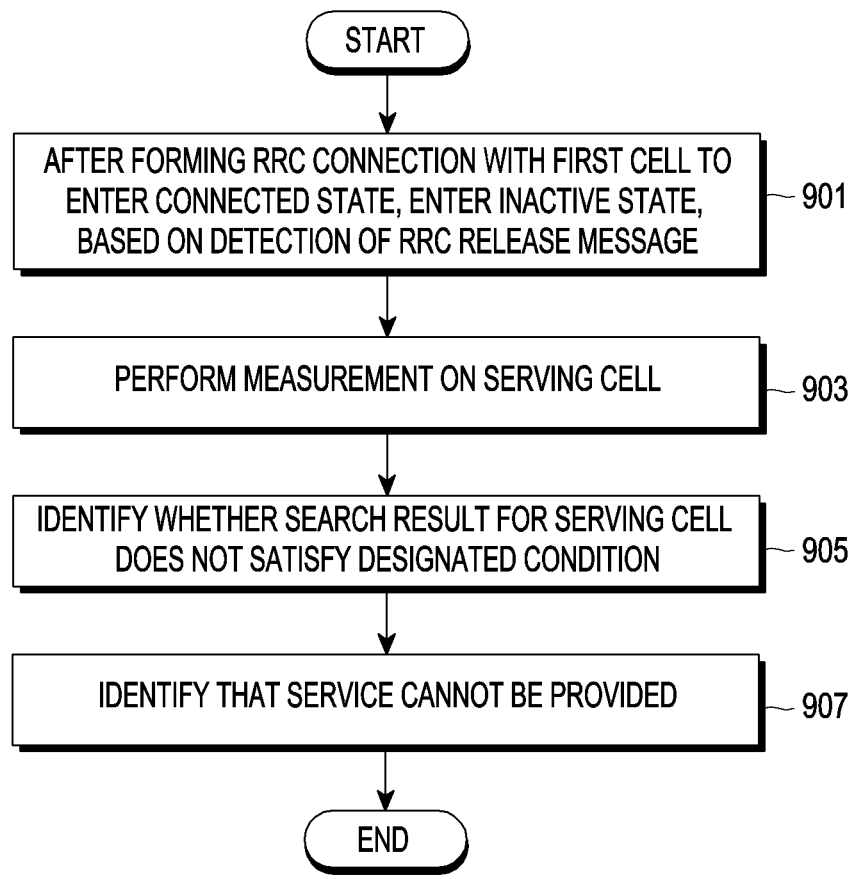
FIG. 9A is a flowchart illustrating an example method of operating an electronic device according to various embodiments.

FIG. 9A is a flowchart illustrating an example method of operating an electronic device according to various embodiments. The operation previously described and included in FIG. 9A will be briefly mentioned.

According to various embodiments, the electronic device 101 (e.g., at least one of the processor 120, the first communication processor 212, the second communication processor 214, or the unified communication processor 260) may, in operation 901, enter an inactive state based on detecting an RRC release message after forming an RRC connection with the first cell to enter the connected state. The RRC release message may include a grace setting (e.g., suspended config), and the electronic device 101 may enter an inactive state based on the grace setting. In an inactive state, the electronic device 101 may camp-on the first cell or another cell. A camp-on cell may be referred to, for example, as a serving cell.

According to various embodiments, the electronic device 101 may perform measurement on the serving cell in operation 903. In operation 905, the electronic device 101 may identify that the measurement result for the serving cell does not satisfy the specified condition. For example, the electronic device 101 may measure RSRP and RSRQ of the signal from the serving cell. The electronic device 101 may identify that the RSRP and RSRQ of the signal fail the cell selection condition (e.g., cell selection criterion S of 3GPP TS 38.304 or 3GPP TS 38.133). For example, the electronic device 101 may determine whether the cell selection RX level (hereinafter referred to as Srxlev), based on the measured RSRP is greater than 0 and the cell selection quality value (hereinafter referred to as Squal), based on the measured RSRQ is greater than 0. When the communication state by the serving cell is relatively good, the electronic device 101 may identify that the measurement result of the signal from the serving cell satisfies the cell selection condition, for example. If the electronic device 101 moves to a service unavailable area (for example, a service unavailable area 531 of FIG. 5B), the electronic device 101 may identify that the measurement result of the signal from the serving cell does not satisfy the cell selection condition, for example. The cell selection condition is merely an example, and the specified condition is not limited as long as it indicates that the electronic device 101 misses the serving PLMN. If it is determined that the measurement result for the serving cell does not satisfy the specified condition, the electronic device 101 may identify that the service cannot be provided in operation 907. As described above, after identifying that the service is not available, the electronic device 101 may search for a cell to camp-on until a timer (e.g., T380 timer), started based on receiving the RRC release message, expires. If a cell to be camped on is found before the timer expires, the electronic device 101 may perform camping-on and maintain the inactive state. If the camping-on is not performed until the timer expires, the electronic device 101 may change to the idle state. In various embodiments, the electronic device 101 may perform a limited search in the idle state. The electronic device 101 may search for an acceptable cell, based on, for example, limited search results, and camp-on the acceptable cell.

Figure 9B:
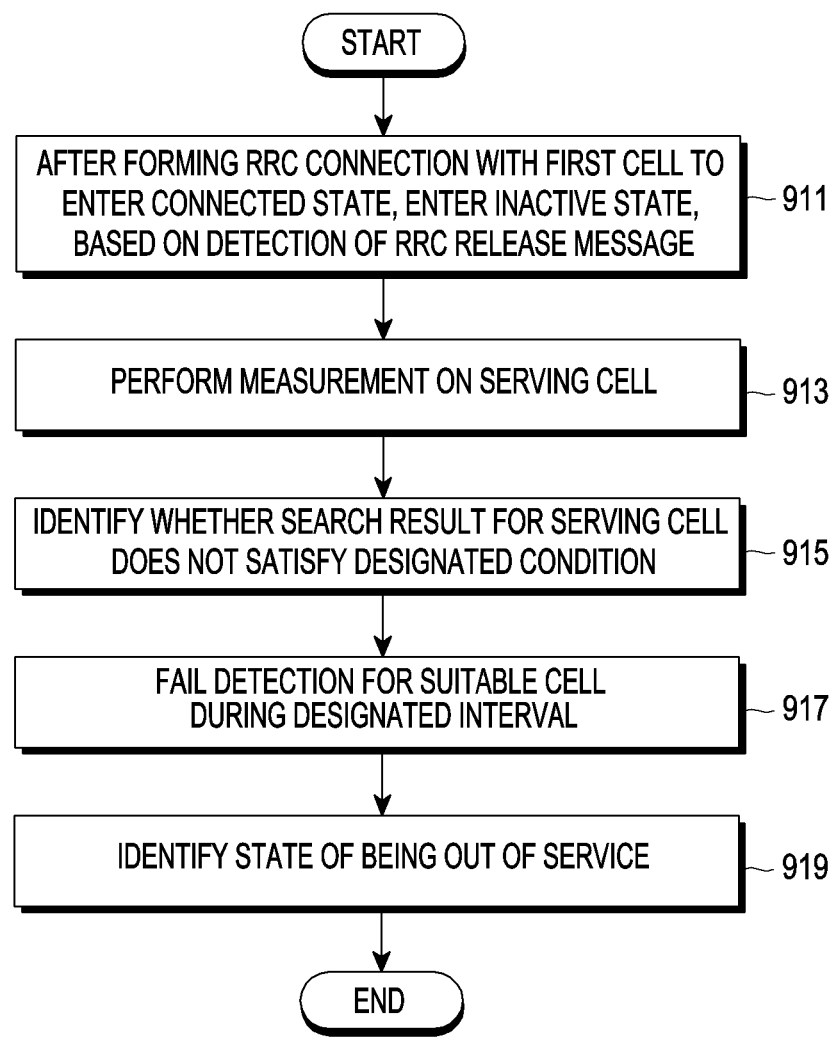
FIG. 9B is a flowchart illustrating an example method of operating an electronic device according to various embodiments.

FIG. 9B is a flowchart for illustrating an example method of operating an electronic device according to various embodiments. Each of operation 911, operation 913, and operation 915 of FIG. 9B may be substantially the same as or similar to operation 901, operation 903, and operation 905 of FIG. 9A, and thus descriptions thereof may not be repeated or may be briefly described.

According to various embodiments, in operation 915, the electronic device 101 (e.g., at least one of the processor 120, the first communication processor 212, the second communication processor 214, or the unified communication processor 260) may identify that the measurement result for the serving cell does not satisfy the specified condition. For example, the electronic device 101 may identify that RSRP and RSRQ from the serving cell do not satisfy the cell selection condition, but the specified condition is not limited. If it is determined that the specified condition is not satisfied, the electronic device 101 may fail to detect a suitable cell for a specified period of operation 917 (e.g., 10 seconds). The electronic device 101 may perform a search, for example, using intra-frequency, inter-frequency, and inter-RAT information specified in system information. If the search for the suitable cell fails during the search period, the electronic device 101 may identify a state of being out of service, in operation 919. Based on the failure of the search for a new suitable cell, an indicator for not providing a service from the AS to the NAS may be provided, and the electronic device 101 may identify that the service is not available. As described above, after identifying that the service is not available, the electronic device 101 may search for a cell to camp-on until a timer (e.g., T380 timer), started based on receiving the RRC release message, expires. If a cell to be camped on is found before the timer expires, the electronic device 101 may perform camping-on and maintain the inactive state. If the camping-on is not performed until the timer expires, the electronic device 101 may change to the idle state. In various embodiments, the electronic device 101 may perform a limited search in the idle state. The electronic device 101 may search for an acceptable cell, based on, for example, limited search results, and camp-on the acceptable cell.

Figure 10:
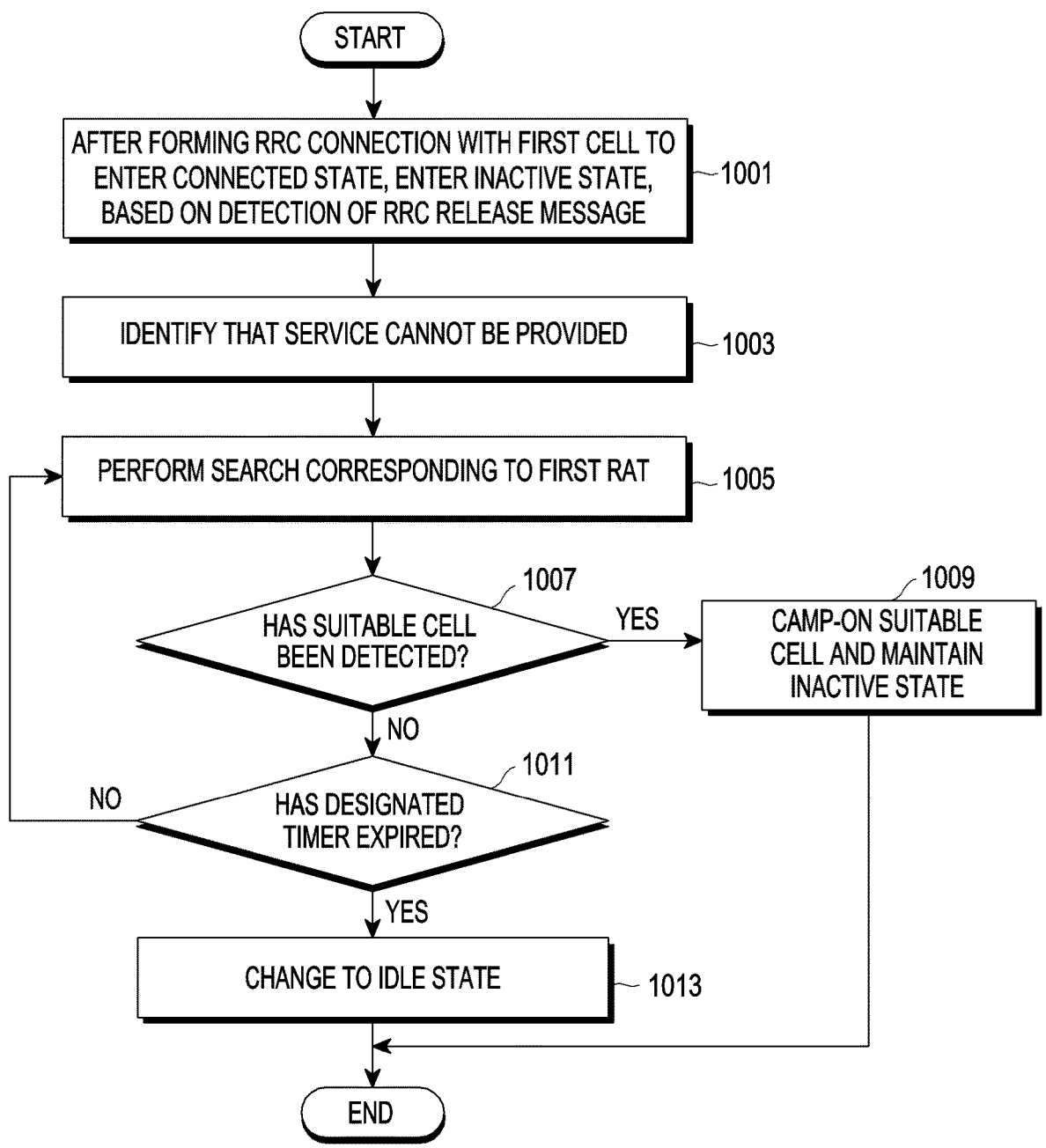
FIG. 10 is a flowchart illustrating an example method of operating an electronic device according to various embodiments.

FIG. 10 is a flowchart illustrating an example method of operating an electronic device according to various embodiments. The operation previously described an included in FIG. 10 may be briefly mentioned.

According to various embodiments, the electronic device 101 (e.g., at least one of the processor 120, the first communication processor 212, the second communication processor 214, or the unified communication processor 260) may, in operation 1001, enter an inactive state, based on detecting an RRC release message after forming an RRC connection with the first cell and entering the connected state. The RRC release message may include a suspension configuration (e.g., suspended config), and the electronic device 101 may enter an inactive state, based on the suspension configuration. In the inactive state, the electronic device 101 may camp-on the first cell or another cell. A camped-on cell may be referred to as a serving cell. According to various embodiments, in operation 1003, the electronic device 101 may identify that a service cannot be provided. For example, the electronic device 101 may identify that the service cannot be provided, based on the provision of the 'service not available' indicator from the AS to the NAS.

According to various embodiments, the electronic device 101 may perform a search corresponding to the first RAT in operation 1005. For example, the RAT of the cell that the electronic device 101 camped on in an inactive state may be the first RAT. The electronic device 101 may perform a search for the same RAT as the RAT of the cell that has been camped on in an inactive state. For example, if the electronic device 101 camps on the cell of the NR network communication and confirms that the service cannot be provided, the electronic device 101 may search for the cell of the serving PLMN of the NR network communication. The electronic device 101 may search, for example, for a cell of the serving PLMN. In operation 1007, the electronic device 101 may identify whether a suitable cell is detected. The suitable cell is, for example, defined in 3GPP TS 38.304, and is a part of any one of the PLMNs in which the cell is selected, or a registered PLMN, or a PLMN in the equivalent PLMN list. When a tracking area code is provided for a corresponding PLMN, it may be considered as a suitable cell. If the RSRP and RSRQ of the signal from the cell satisfies the cell selection condition (e.g., cell selection criterion S of 3GPP TS 38.304 or 3GPP TS 38.133), the corresponding cell may be considered as a suitable cell. For example, if it is determined that the cell selection RX level value (hereinafter referred to as Srxlev), based on the measured RSRP is greater than 0 and the cell selection quality value (hereinafter referred to as Squal), based on the measured RSRQ is greater than 0, the electronic device 101 may identify that the suitable cell is detected.

If it is determined that a suitable cell is detected (1007— Yes), according to various embodiments, the electronic device 101 may camp-on the suitable cell in operation 1009 and maintain an inactive state. For synchronization with the network, the electronic device 101 may transmit an RRC resume request in which the cause is set to RNA update. If the detection of the suitable cell fails (1007—No), the electronic device 101 may check whether the timer (e.g., T380 timer) specified in operation 1011 has expired. Before the specified timer expires (1011—No), the electronic device 101 may continue to search. If it is determined that the designated timer has expired (1011—Yes), the electronic device 101 may change to the idle state in operation 1013. In various embodiments, the electronic device 101 may perform a limited search in the idle state. The electronic device 101 may search for an acceptable cell, based on, for example, limited search results, and camp-on the acceptable cell. The acceptable cell may refer, for example, to a cell that may be camped-on to obtain limited services, such as emergency call origination, and reception of emergency notifications (e.g. earthquake and tsunami warning system (ETWS) and commercial mobile alert system (CMAS) notifications). If the cell is not limited (barred) and the cell selection condition is satisfied, it may be regarded as an acceptable cell.

Figure 11:
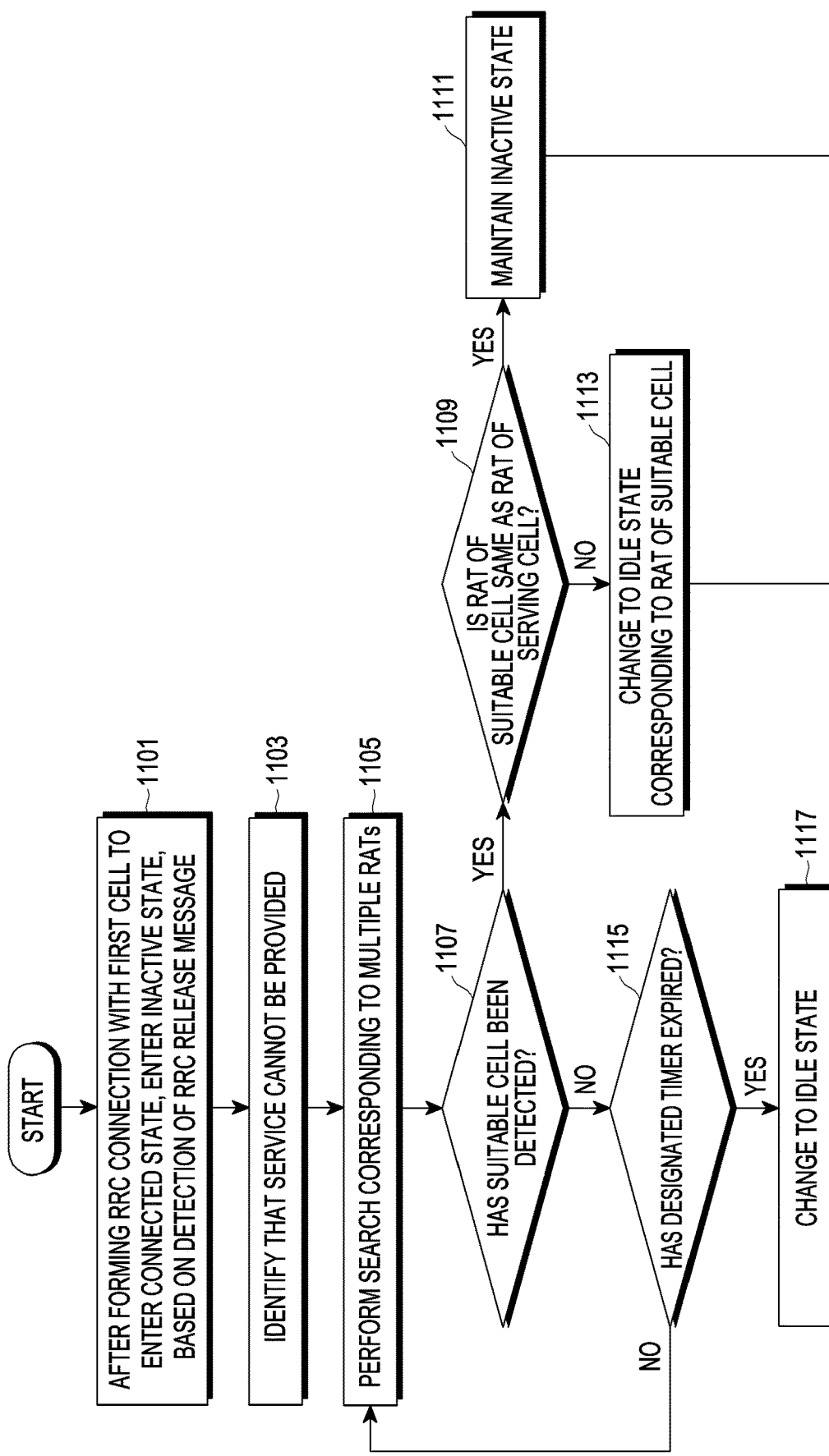
FIG. 11 is a flowchart illustrating an example method of operating an electronic device according to various embodiments.

FIG. 11 is a flowchart illustrating an example method of operating an electronic device according to various embodiments. The operation previously described and included in FIG. 11 may be briefly mentioned.

According to various embodiments, the electronic device 101 (e.g., at least one of the processor 120, the first communication processor 212, the second communication processor 214, or the unified communication processor 260) may, in operation 1101, enter an inactive state, based on detecting an RRC release message after forming an RRC connection with the first cell and entering the connected state. The RRC release message may include a suspension configuration (e.g., suspended config), and the electronic device 101 may enter an inactive state, based on the grace setting. In the inactive state, the electronic device 101 may camp-on the first cell or another cell. The camped-on cell may be referred to as a serving cell. According to various embodiments, in operation 1103, the electronic device 101 may identify that a service cannot be provided. For example, the electronic device 101 may identify that the service cannot be provided, based on the provision of the 'service not available' indicator from the AS to the NAS.

According to various embodiments, the electronic device 101 may perform a search corresponding to a plurality of RATs in operation 1105. The electronic device 101 may perform a search corresponding to a plurality of RATs including RATs of cells that have been camped on in an inactive state. For example, the electronic device 101 may identify that the service is unavailable after camping on the cell corresponding to the NR network communication in an inactive state. The electronic device 101 may search for a cell of a serving PLMN corresponding to 4G network communication, 3G network communication, or 2G network communication as well as NR network communication. In operation 1107, the electronic device 101 may identify whether a suitable cell has been detected.

When it is determined that a suitable cell has been detected (1107—Yes), according to various embodiments, in operation 1109 the electronic device 101 may identify whether the RAT of the suitable cell detected in operation 1107 is the same as the RAT of the serving cell. As described above, since the electronic device 101 searches for a plurality of RATs including the RAT of the serving cell that has been camped-on, the suitable cell of the same RAT as the RAT of the serving cell may be detected. If it is identified that the RAT of the detected suitable cell is the same as the RAT of the serving cell (1109—Yes), the electronic device 101 may maintain an inactive state in operation 1111. The electronic device 101 may camp-on a suitable cell and maintain an inactive state. For synchronization with the network, the electronic device 101 may transmit an RRC resume request in which the cause is configured to RNA update. If it is identified that the RAT of the detected suitable cell is not the same as the RAT of the serving cell (1109— No), in operation 1113, the electronic device 101 may change to the idle state corresponding to the RAT of the suitable cell. The electronic device 101 may perform cell reselection for a suitable cell and change to an idle state accordingly. For example, as shown in FIG. 5, it is not possible to directly change from the inactive state (e.g., NR RRC_INACTIVE state) of the first RAT (e.g., NR network communication) to the inactive state (e.g., EUTRA RRC_INACTIVE state) of the second RAT (e.g., EUTRA). In the inactive state of the first RAT, the second RAT may be changed to the idle state, and accordingly, the electronic device 101 may change to the idle state corresponding to the RAT of the suitable cell. For example, the electronic device 101 may be in an NR RRC_INACTIVE state, and identify that the service cannot be provided. The electronic device 101 may detect a suitable cell of the EUAT RAT according to the search results. The electronic device 101 may change to the EUTRA RRC_IDLE state, and camp-on the detected suitable cell.

If detection of a suitable cell fails (1107—No), according to various embodiments, the electronic device 101 may identify whether a timer (e.g., T380 timer) specified in operation 1115 has expired. Before the timer expires (1115—No), the electronic device 101 may perform a search corresponding to a plurality of RATs. The electronic device 101 may sequentially perform searches for each of the plurality of RATs, for example, before the timer expires. For example, the electronic device 101 may perform a search for the RAT of a serving cell that has been camped on before service availability is not identified, and may fail to search for a suitable cell. Thereafter, the electronic device 101 may search for another RAT. The electronic device 101 may perform a search while sequentially changing the plurality of RATs until a suitable cell is searched for.

According to various embodiments, when it is identified that the timer has expired (1115—Yes), the electronic device 101 may change to the idle state in operation 1117. In various embodiments, the electronic device 101 may perform a limited search in the idle state. The electronic device 101 may perform a search for an acceptable cell, based on, for example, limited search results, and camp-on the acceptable cell.

Figure 12:
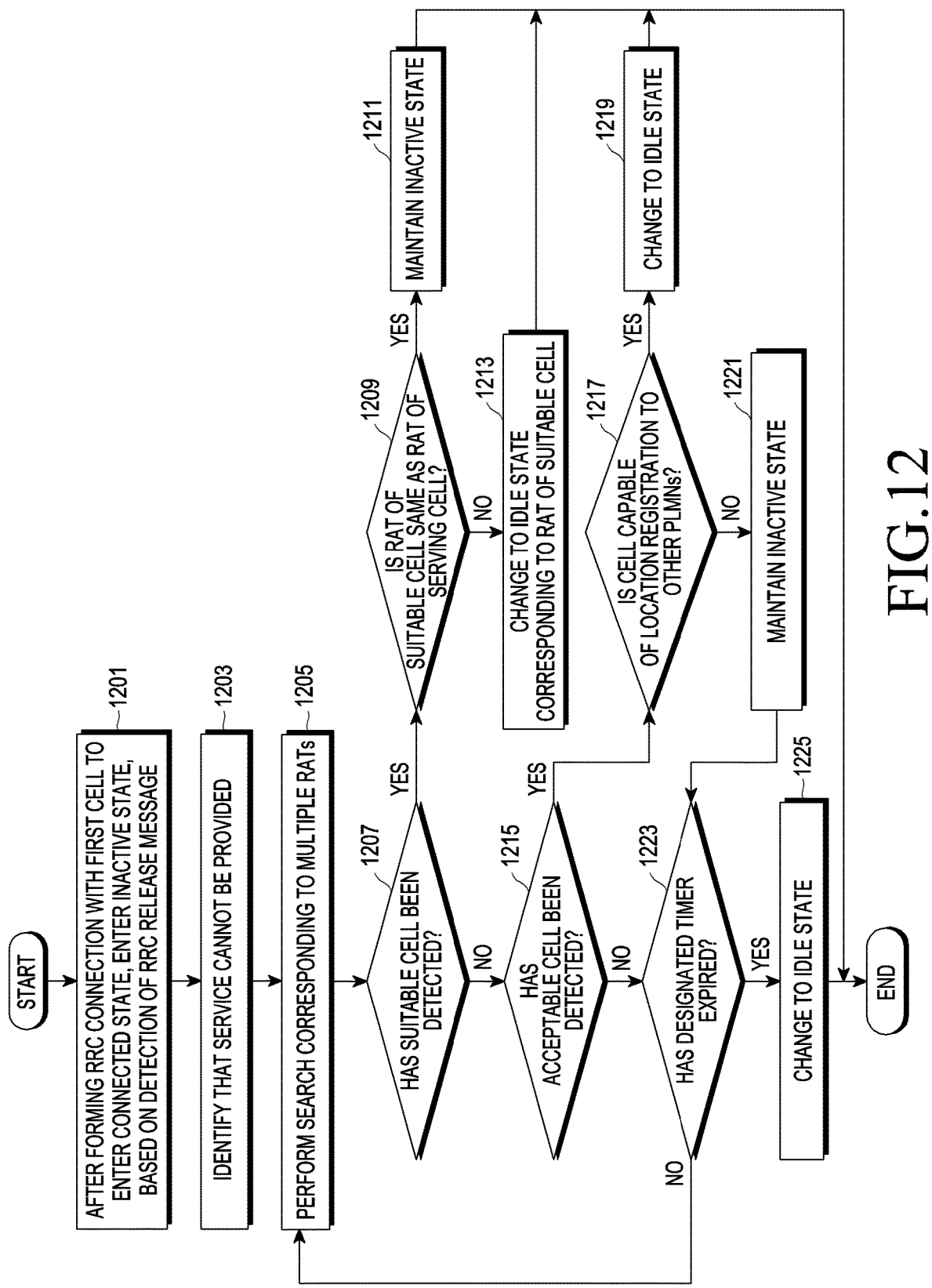
FIG. 12 is a flowchart illustrating an example method of operating an electronic device according to various embodiments.

FIG. 12 is a flowchart illustrating an example method of operating an electronic device according to various embodiments. The operation previously described and included in FIG. 12 may be briefly mentioned.

According to various embodiments, the electronic device 101 (e.g., at least one of the processor 120, the first communication processor 212, the second communication processor 214, or the unified communication processor 260) may, in operation 1201, enter an inactive state, based on detecting an RRC release message after forming an RRC connection with the first cell and entering the connected state. The RRC release message may include a suspension configuration (e.g., suspended config), and the electronic device 101 may enter an inactive state, based on the suspension configuration. In the inactive state, the electronic device 101 may camp-on the first cell or another cell. A camped-on cell may be referred to as a serving cell. According to various embodiments, in operation 1203, the electronic device 101 may identify that service is not available. For example, the electronic device 101 may identify that the service cannot be provided, based on the provision of the 'service not available' indicator from the AS to the NAS.

According to various embodiments, the electronic device 101 may perform a search corresponding to a plurality of RATs in operation 1205. The electronic device 101 may perform a search corresponding to the plurality of RATs including RATs of cells that have been camped on in the inactive state. In operation 1207, the electronic device 101 may identify whether a suitable cell has been detected.

If it is identified that a suitable cell has been detected (1207—Yes), according to various embodiments, the electronic device 101 may identify in operation 1209 whether the RAT of the suitable cell detected in operation 1207 is the same as the RAT of the serving cell. As described above, since the electronic device 101 searches for the plurality of RATs including the RAT of the serving cell that has been camped-on, the suitable cell of the same RAT as the RAT of the serving cell may be detected. If it is identified that the RAT of the detected suitable cell is the same as the RAT of the serving cell (1209—Yes), the electronic device 101 may maintain an inactive state in operation 1211. The electronic device 101 may camp-on a suitable cell and maintain an inactive state. For synchronization with the network, the electronic device 101 may transmit an RRC resume request in which the cause is configured to RNA update. If it is identified that the RAT of the detected suitable cell is not the same as the RAT of the serving cell (1209—No), in operation 1213, the electronic device 101 may change to an idle state corresponding to the RAT of the suitable cell. The electronic device 101 may change to the idle state according to cell reselection for a suitable cell.

If detection of a suitable cell fails (1207—No), according to various embodiments, the electronic device 101 may identify whether an acceptable cell is detected in operation 1215. If it is identified that the acceptable cell is detected (1215—Yes), the electronic device 101 may identify whether the detected cell is a cell capable of location registration in another PLMN in operation 1217. For example, if it is not a forbidden PLMN (forbidden PLMN), it may be determined that location registration is possible with another PLMN. If it is identified that the detected cell is a cell capable of registering a location in another PLMN (1217—Yes), the electronic device 101 may change to the idle state in operation 1219. For example, the electronic device 101 may perform cell reselection and change to the idle state accordingly. The electronic device 101 may perform a location registration operation. If the detected cell is not identified as a cell capable of location registration in another PLMN (1217—No), the electronic device 101 may remain inactive in operation 1221. While maintaining the inactive state, the electronic device 101 may identify whether the timer (e.g., T380 timer) specified in operation 1223 has expired. Before the timer expires (1223—No), the electronic device 101 may perform a search corresponding to a plurality of RATs. The electronic device 101 may sequentially search for each of the plurality of RATs, for example, before the timer expires. For example, the electronic device 101 may perform a search for the RAT of a serving cell that has been camped on before service availability is not identified, and may fail to search for a suitable cell. Thereafter, the electronic device 101 may perform a search for another RAT. The electronic device 101 may perform a search while sequentially changing a plurality of RATs until a suitable cell is searched for. In the NAS, it is possible to determine whether camping-on has occurred and/or whether the state of the electronic device is maintained or changed, based on information about available cells and/or suitable cells.

According to various embodiments, when it is determined that the timer has expired (1223—Yes), the electronic device 101 may change to the idle state in operation 1225. In various embodiments, the electronic device 101 may perform a limited search in the idle state. The electronic device 101 may search for an acceptable cell, based on, for example, limited search results, and camp-on the acceptable cell.

Figure 13A:
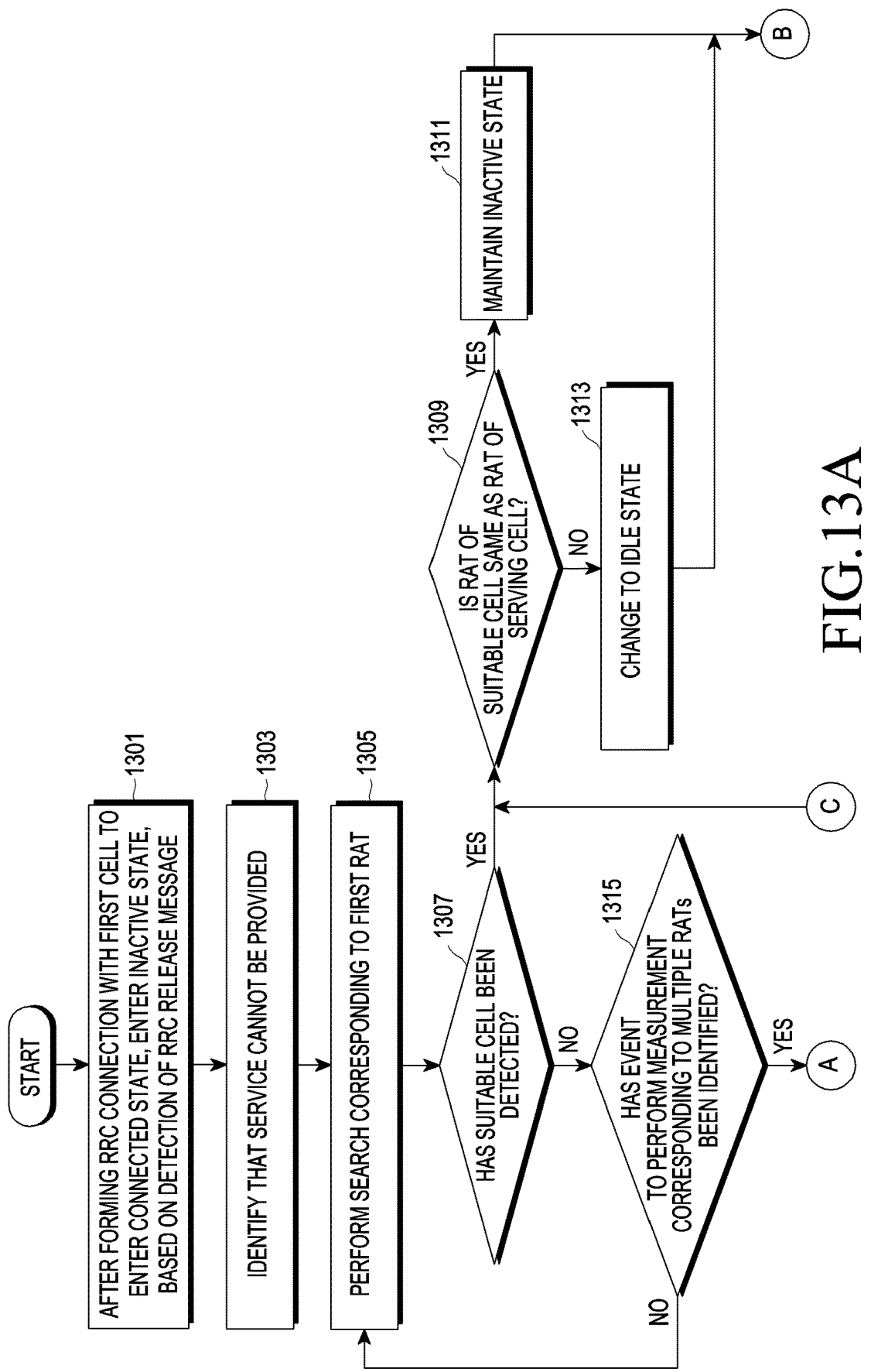
FIG. 13A is a flowchart illustrating an example method of operating an electronic device according to various embodiments.
Figure 13B:
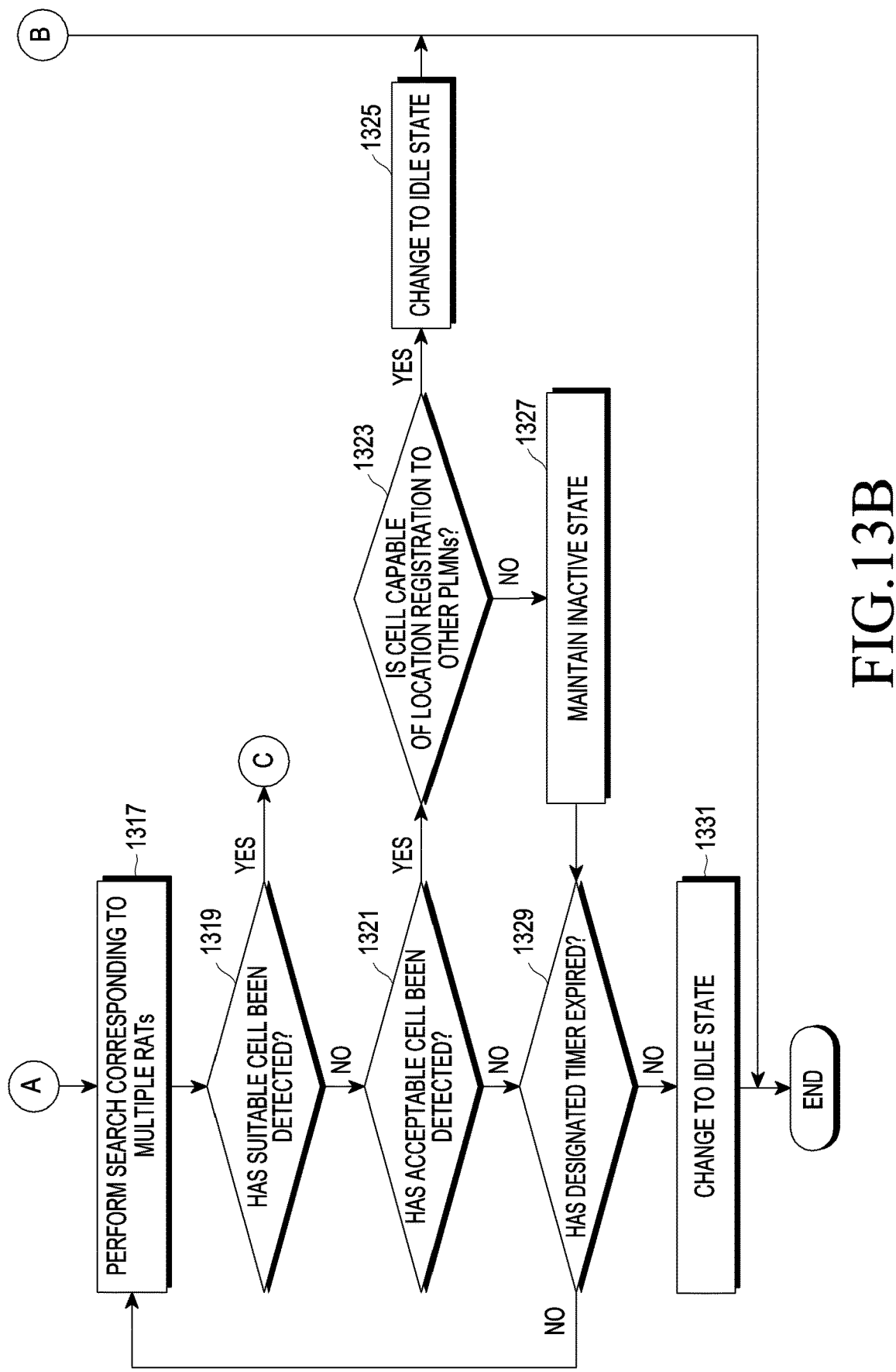
FIG. 13B is a flowchart illustrating an example method of operating an electronic device according to various embodiments.

FIG. 13A is a flowchart illustrating an example method of operating an electronic device according to various embodiments, and FIG. 13B is a flowchart illustrating an example method of operating an electronic device according to various embodiments. The operations previously described and included in FIGS. 13A and 13B may be briefly mentioned.

According to various embodiments, the electronic device 101 (e.g., at least one of the processor 120, the first communication processor 212, the second communication processor 214, or the unified communication processor 260) may, in operation 1301, enter an inactive state, based on detecting an RRC release message after forming an RRC connection with the first cell and entering the connected state. The RRC release message may include a suspension configuration (e.g., suspended config), and the electronic device 101 may enter an inactive state, based on the suspension configuration. In the inactive state, the electronic device 101 may camp-on the first cell or another cell. A camped-on cell may be referred to as a serving cell. According to various embodiments, in operation 1303, the electronic device 101 may identify that service is not available (e.g., cannot be provided). For example, the electronic device 101 may identify that the service cannot be provided, based on the provision of the 'service not available' indicator from the AS to the NAS.

According to various embodiments, the electronic device 101 may perform a search corresponding to the first RAT in operation 1305. For example, the RAT of the cell that the electronic device 101 camped on in an inactive state may be the first RAT. The electronic device 101 may perform a search for the same RAT as the RAT of the cell that has been camped on in an inactive state. In operation 1307, the electronic device 101 may identify whether a suitable cell has been detected. If it is identified that a suitable cell has been detected (1307—Yes), according to various embodiments, the electronic device 101 may identify in operation 1309 whether the RAT of the suitable cell is the same as the RAT of the serving cell in operation 1307. In operation 1305, since the electronic device 101 performs a search for the same RAT as the RAT of the serving cell, the determination result of operation 1309 may identify that the RAT of the suitable cell is the same as the RAT of the serving cell (1309—Yes). In operation 1311, the electronic device 101 may camp-on a suitable cell and maintain an inactive state.

According to various embodiments, if detection of a suitable cell fails (1307—No), the electronic device 101 may determine whether an event for performing a search corresponding to a plurality of RATs occurs in operation 1315. According to various embodiments, the event may be, for example, exceeding a specified period. According to various embodiments, the event may be, for example, a specified number of searches. If the event identification fails (1315—No), the electronic device 101 may perform a search corresponding to the first RAT. If a suitable cell is not detected until the event is identified, the electronic device 101 may repeat the search corresponding to the first RAT. During repetition of the search corresponding to the first RAT, a specified period may be exceeded, or the number of repetitions may be greater than or equal to a specified number of times. The electronic device 101 may identify the event accordingly, but the above-described event is merely an example, and there is no limit to the event configured to stop searching corresponding to the first RAT.

According to various embodiments, when the event is identified (1315—Yes), the electronic device 101 may perform a search corresponding to a plurality of RATs including the first RAT in operation 1317. For example, the electronic device 101 may identify that the service is unavailable after camping on the cell corresponding to the NR network communication in an inactive state. The electronic device 101 may search for a cell of a serving PLMN corresponding to 4G network communication, 3G network communication, or 2G network communication as well as NR network communication. In operation 1319, the electronic device 101 may identify whether a suitable cell has been detected.

If it is identified that a suitable cell is detected (1319—Yes), according to various embodiments, the electronic device 101 may identify in operation 1309 whether the RAT of the suitable cell detected is the same as the RAT of the serving cell. If it is identified that the RAT of the detected suitable cell is the same as the RAT of the serving cell (1309—Yes), the electronic device 101 may maintain an inactive state in operation 1311. The electronic device 101 may camp-on a suitable cell and maintain an inactive state. For synchronization with the network, the electronic device 101 may transmit an RRC resume request in which the cause is configured to RNA update. If it is identified that the RAT of the detected suitable cell is not the same as the RAT of the serving cell (1309—No), the electronic device 101 may change to the idle state corresponding to the RAT of the suitable cell in operation 1313.

If detection of a suitable cell fails (1319—No), according to various embodiments, the electronic device 101 may identify whether an acceptable cell has been detected in operation 1321. If it is identified that the acceptable cell is detected (1321—Yes), the electronic device 101 may identify whether the detected cell is a cell capable of location registration in another PLMN in operation 1323. If it is identified that the detected cell is a cell capable of location registration in another PLMN (1323—Yes), the electronic device 101 may change to the idle state in operation 1325. For example, the electronic device 101 may perform cell reselection and change to the idle state accordingly. The electronic device 101 may perform a location registration operation. If the detected cell is not identified as a cell capable of location registration in another PLMN (1323—No), the electronic device 101 may remain inactive in operation 1327. For example, the electronic device 101 may maintain an inactive state while maintaining the camped-on state for the current camped-on cell. While maintaining the inactive state, the electronic device 101 may identify whether the timer (e.g., T380 timer) specified in operation 1329 has expired. Before the timer expires (1329—No), the electronic device 101 may perform a search corresponding to a plurality of RATs.

According to various embodiments, if it is determined that the timer has expired (1329—Yes), the electronic device 101 may change to the idle state in operation 1331. In various embodiments, the electronic device 101 may perform a limited search in the idle state. The electronic device 101 may search for an acceptable cell, based on, for example, limited search results, and camp-on the acceptable cell.

Figure 14:
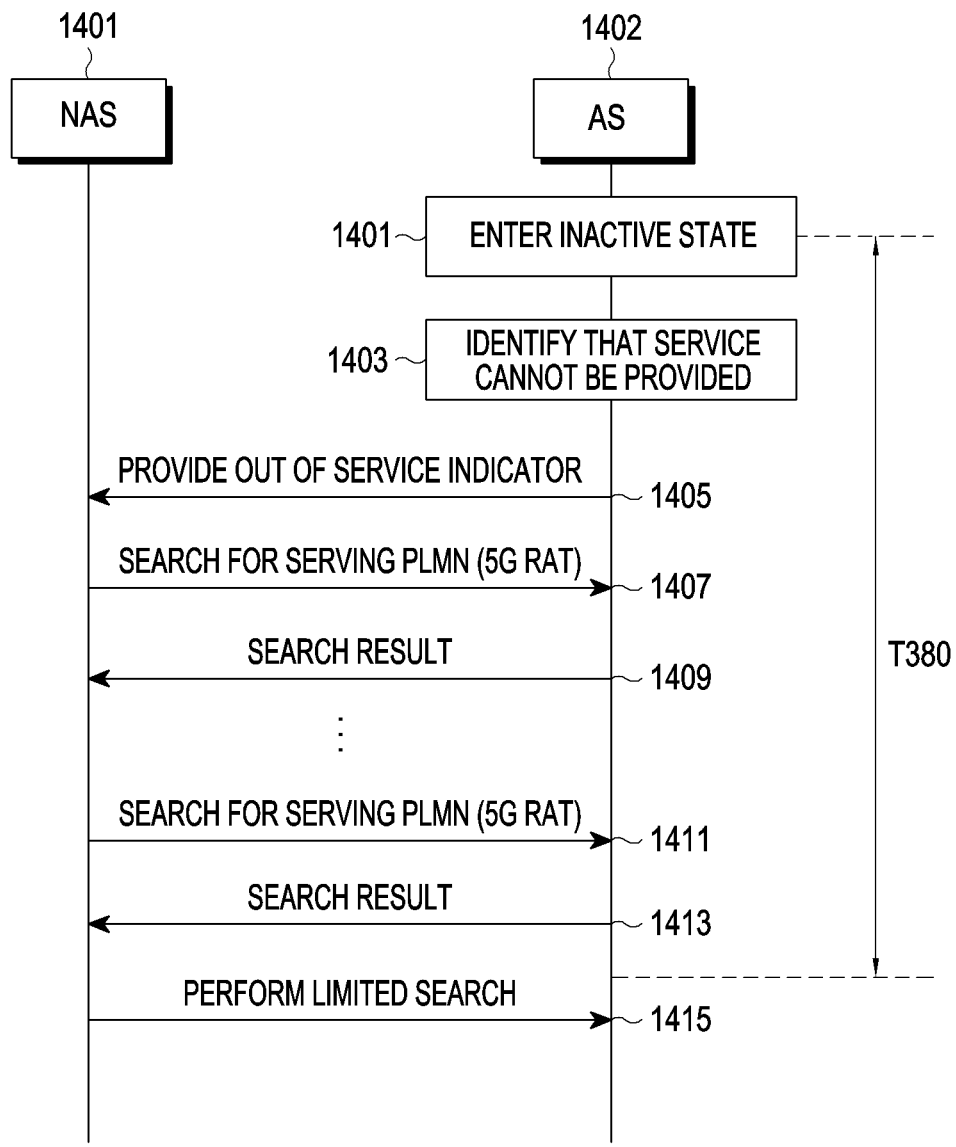
FIG. 14 is a signal flow diagram illustrating an example operation of a NAS and an AS according to various embodiments.

FIG. 14 is a signal flow diagram illustrating an example operation of a NAS and an AS according to various embodiments. It may be understood that at least one operation performed by the NAS and/or the AS is performed, for example, by at least one of the processor 120, the first communication processor 212, the second communication processor 214, or the unified communication processor 260 of the electronic device 101.

In various embodiments, the AS 1402 may enter an inactive state, in operation 1401. For example, the AS 1402 may enter an inactive state, based on identifying an RRC release message including a suspension config. In the inactive state, for example, AS 1402 may camp-on a cell corresponding to 5G RAT. A timer (e.g., T380 timer) may be started based on the RRC release message identification. The AS 1402 may identify that the service cannot be provided in operation 1403. For example, the AS 1402 may fail to search for a suitable cell within a specified time (e.g., 10 seconds). In operation 1405, the AS 1402 may provide a 'no service' or out of service indicator to the NAS 1401.

In various embodiments, the NAS 1401 may request to perform a search for a serving PLMN. For example, in operation 1407, a search for a 5G RAT may be requested to AS 1402. Based on the request of the NAS 1401, the AS 1402 may search for available PLMNs and report the result to the NAS 1401. The AS 1402 may transmit the search results for the 5G RAT to the NAS 1401 in operation 1409. For example, the AS 1402 may transmit information indicating that the identifier of the PLMN is (450 05) as a search result and information indicating that the RAT is NG-RAN to the NAS 1401. Among examples of identifiers of the PLMN, 450 may be a mobile country code (MCC), and 05 may be a mobile network code (MNC). The NAS 1401 may determine whether a suitable cell is detected, based on the search results. When a suitable cell is not detected, the NAS 1401 may request the AS 1402 to perform a search for a 5G RAT, for example, in operation 1411. The AS 1402 may transmit the search results for the 5G RAT to the NAS 1401 in operation 1413. The NAS 1401 may repeatedly perform a search request until a suitable cell is detected. When the timer (e.g., T380 timer) expires, in operation 1415, the NAS 1401 may request the AS 1402 to perform a limited search.

Figure 15:
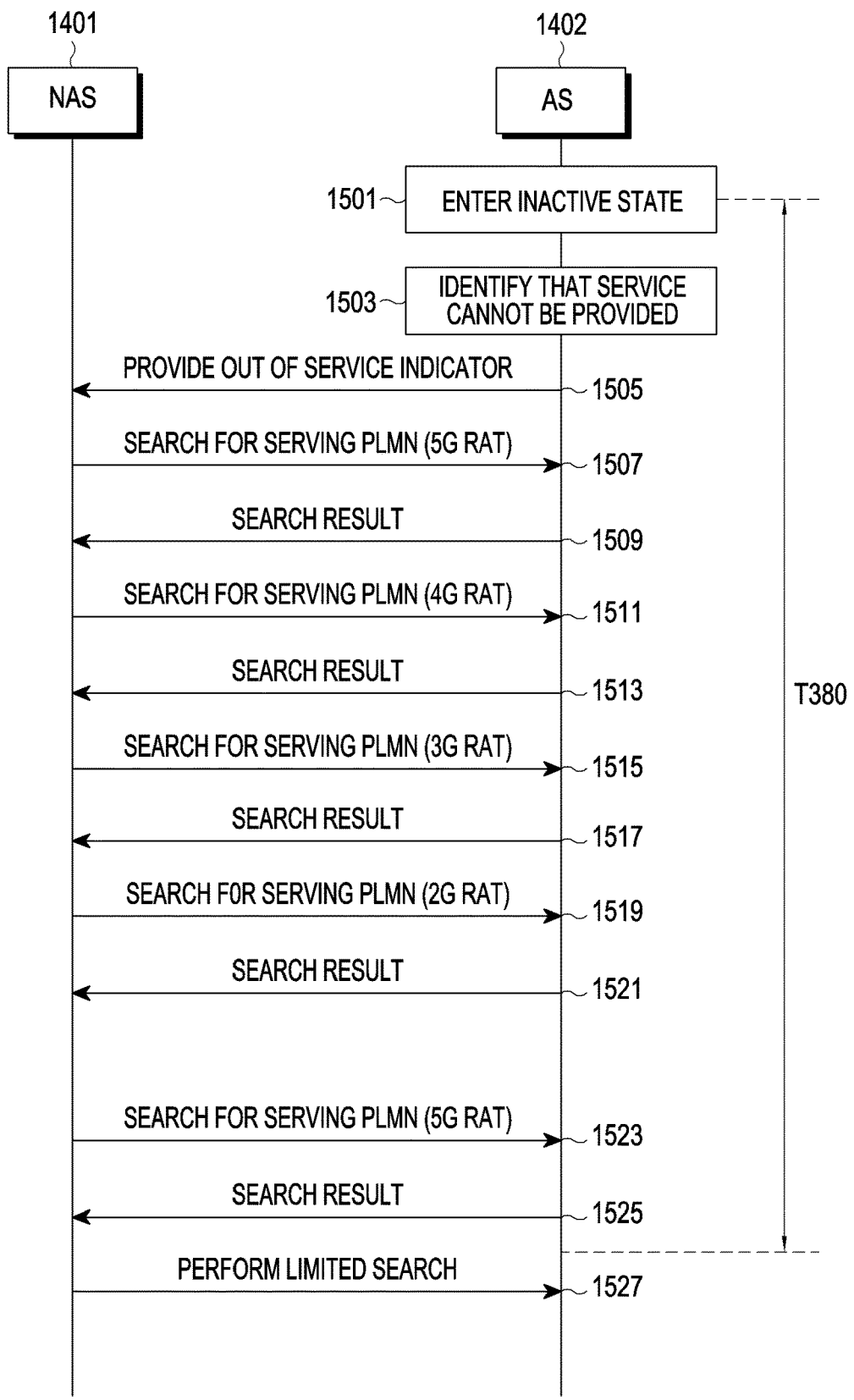
FIG. 15 is a signal flow diagram illustrating an example operation of a NAS and an AS according to various embodiments.

FIG. 15 is a signal flow diagram illustrating an example operation of a NAS and an AS according to various embodiments.

In various embodiments, the AS 1402 may enter an inactive state in operation 1501. For example, the AS 1402 may enter an inactive state, based on identifying an RRC release message including a suspension config. In the inactive state, for example, AS 1402 may camp-on a cell corresponding to 5G RAT. A timer (e.g., T380 timer) may be started based on the RRC release message identification. In operation 1503, the AS 1402 may identify that a service cannot be provided. For example, the AS 1402 may fail to search for a suitable cell within a specified time (e.g., 10 seconds). In operation 1505, the AS 1402 may provide a 'no service' or out of service indicator to the NAS 1401.

In various embodiments, the NAS 1401 may request a search for a serving PLMN, and in operation 1507, for example, may request to perform a search for the 5G RAT to the AS 1402. The AS 1402 may transmit the search results for the 5G RAT to the NAS 1401 in operation 1509. The NAS 1401 may identify whether a suitable cell is detected, based on the search results. When a suitable cell has not been detected, the NAS 1401 may request the AS 1402 to perform a search for a 4G RAT, for example, in operation 1511. The AS 1402 may transmit the search results for the 4G RAT to the NAS 1401 in operation 1513. When a suitable cell has not been detected, the NAS 1401 may request the AS 1402 to perform a search for a 3G RAT, for example, in operation 1515. The AS 1402 may transmit the search results for the 3G RAT to the NAS 1401 in operation 1517. When a suitable cell has not been detected, the NAS 1401 may request the AS 1402 to search for a 2G RAT, for example, in operation 1519. The AS 1402 may transmit the search results for the 2G RAT to the NAS 1401 in operation 1521. Thereafter, when a suitable cell has not been detected, the NAS 1401 may request the AS 1402 to perform a search for a 5G RAT, for example, in operation 1523. The AS 1402 may transmit the search results for 5G RAT to the NAS 1401 in operation 1525. The NAS 1401 may repeatedly perform a search request until a suitable cell is detected. Those skilled in the art will understand that the search order and/or combination of different RATs is merely illustrative and not limited. When the timer (e.g., T380 timer) expires, in operation 1527, the NAS 1401 may request the AS 1402 to perform a limited search. If a suitable cell for the same RAT as the RAT (e.g., 5G RAT) of the cell that has been camped on is detected, the electronic device 101 may camp-on the suitable cell to maintain an inactive state. If a suitable cell for a RAT different from a RAT (e.g., 5G RAT) of a camped-on cell is detected, the electronic device 101 may change to an idle state corresponding to the corresponding RAT.

Figure 16:
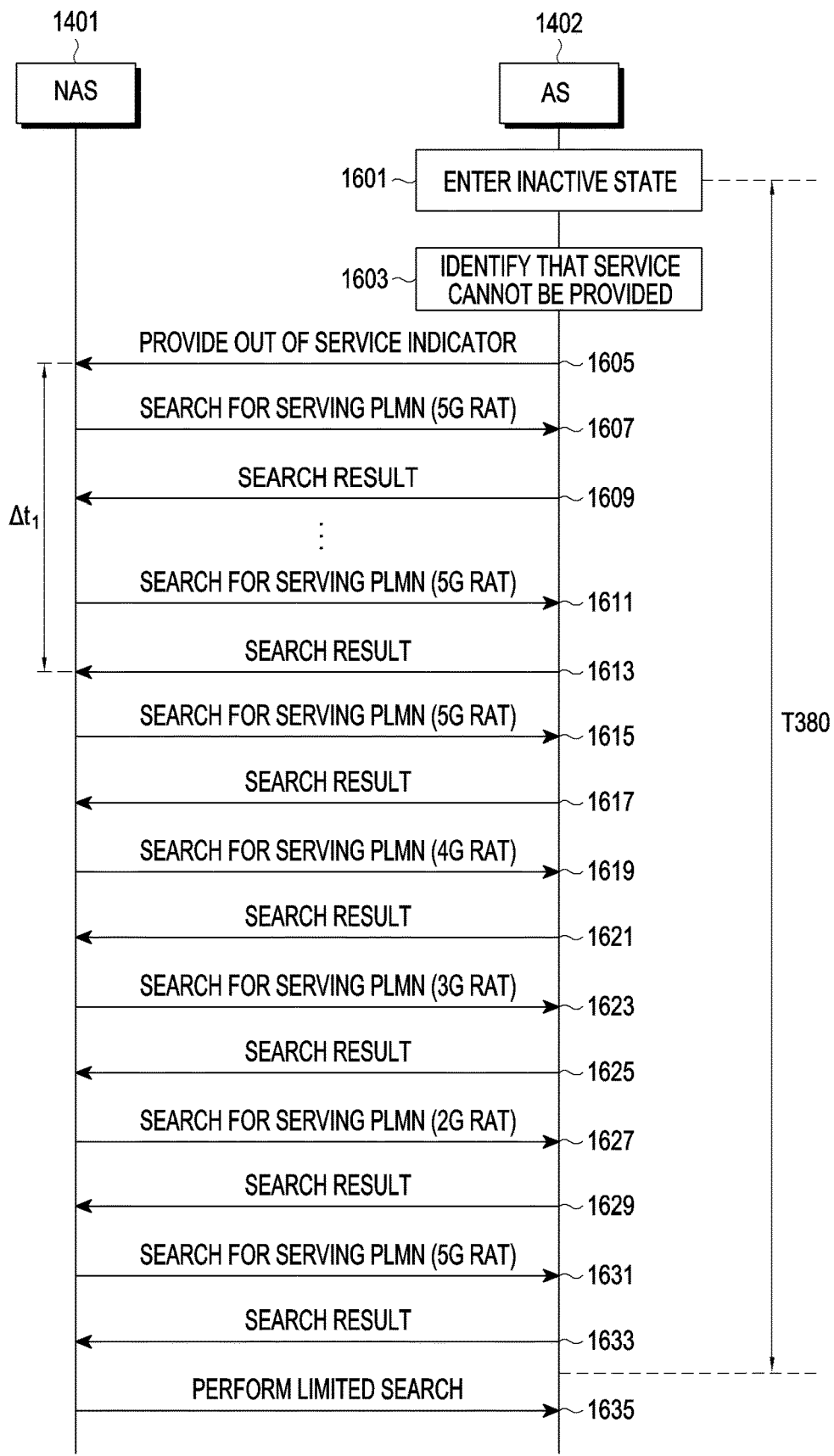
FIG. 16 is a signal flow diagram illustrating example operation of a NAS and an AS according to various embodiments.

FIG. 16 is a signal flow diagram illustrating an example operation of a NAS and an AS according to various embodiments.

In various embodiments, the AS 1402 may enter an inactive state, in operation 1601. For example, the AS 1402 may enter an inactive state, based on identifying an RRC release message including a suspension config. In the inactive state, for example, AS 1402 may camp-on a cell corresponding to a 5G RAT. A timer (e.g., T380 timer) may be started based on the RRC release message identification. The AS 1402 may identify that the service cannot be provided in operation 1603. For example, the AS 1402 may fail to search for a suitable cell within a specified time (e.g., 10 seconds). In operation 1605, the AS 1402 may provide a 'no service' or out of service indicator to the NAS 1401.

In various embodiments, the NAS 1401 may request a search for a serving PLMN, and in operation 1607, for example, may request to perform a search for a 5G RAT to AS 1402. The AS 1402 may transmit the search results for the 5G RAT to the NAS 1401 in operation 1609. The NAS 1401 may identify whether a suitable cell is detected, based on the search results. When a suitable cell has not been detected, the NAS 1401 may request the AS 1402 to perform a search for a 5G RAT, for example, in operation 1611. The AS 1402 may transmit the search results for the 5G RAT to the NAS 1401 in operation 1613. The NAS 1401 may repeatedly perform a search request until a suitable cell is detected. When it is identified that a designated period $\Delta t1$ is exceeded, the electronic device 101 may stop searching for only the 5G RAT. As described above, the electronic device 101 may stop searching for only the 5G RAT, based on whether the number of times the search is greater than the number of times specified, not exceeding the specified period $\Delta t1$.

In various embodiments, the NAS 1401 may request a search for a serving PLMN, and in operation 1615, for example, may request to perform a search for a 5G RAT to AS 1402. The AS 1402 may transmit the search results for the 5G RAT to the NAS 1401 in operation 1617. The NAS 1401 may identify whether a suitable cell is detected, based on the search results. When a suitable cell has not been detected, the NAS 1401 may request the AS 1402 to perform a search for a 4G RAT, for example, in operation 1619. The AS 1402 may transmit the search results for the 4G RAT to the NAS 1401 in operation 1621. When a suitable cell has not been detected, the NAS 1401 may request the AS 1402 to perform a search for a 3G RAT, for example, in operation 1623. The AS 1402 may transmit the search results for the 3G RAT to the NAS 1401 in operation 1625. When a suitable cell has not been detected, the NAS 1401 may request the AS 1402 to perform a search for a 2G RAT, for example, in operation 1627. The AS 1402 may transmit the search results for the 2G RAT to the NAS 1401 in operation 1629. Thereafter, when a suitable cell has not been detected, the NAS 1401 may request the AS 1402 to perform a search for a 5G RAT, for example, in operation 1631. The AS 1402 may transmit the search results for the 5G RAT to the NAS 1401 in operation 1633. The NAS 1401 may repeatedly perform a search request until a suitable cell is detected. When the timer (e.g., T380 timer) expires, in operation 1635, the NAS 1401 may request the AS 1402 to perform a limited search. Those skilled in the art will understand that the search order and/or combination of the different RATs in FIG. 16 is merely illustrative and not limited.

As described above, for example, if it is decided to stop searching for only a 5G RAT, based on exceeding the specified period ($\Delta t1$), the electronic device 101 may perform a search for a plurality of RATs (5G RAT, 4G RAT, 3G RAT, 2G RAT) as shown in FIG. 16. In another embodiment, if it is determined to stop searching for only a 5G RAT, the electronic device 101 may be configured to perform a search for a plurality of RATs (4G RAT, 3G RAT, and 2G RAT) except 5G RAT.

Figure 17:
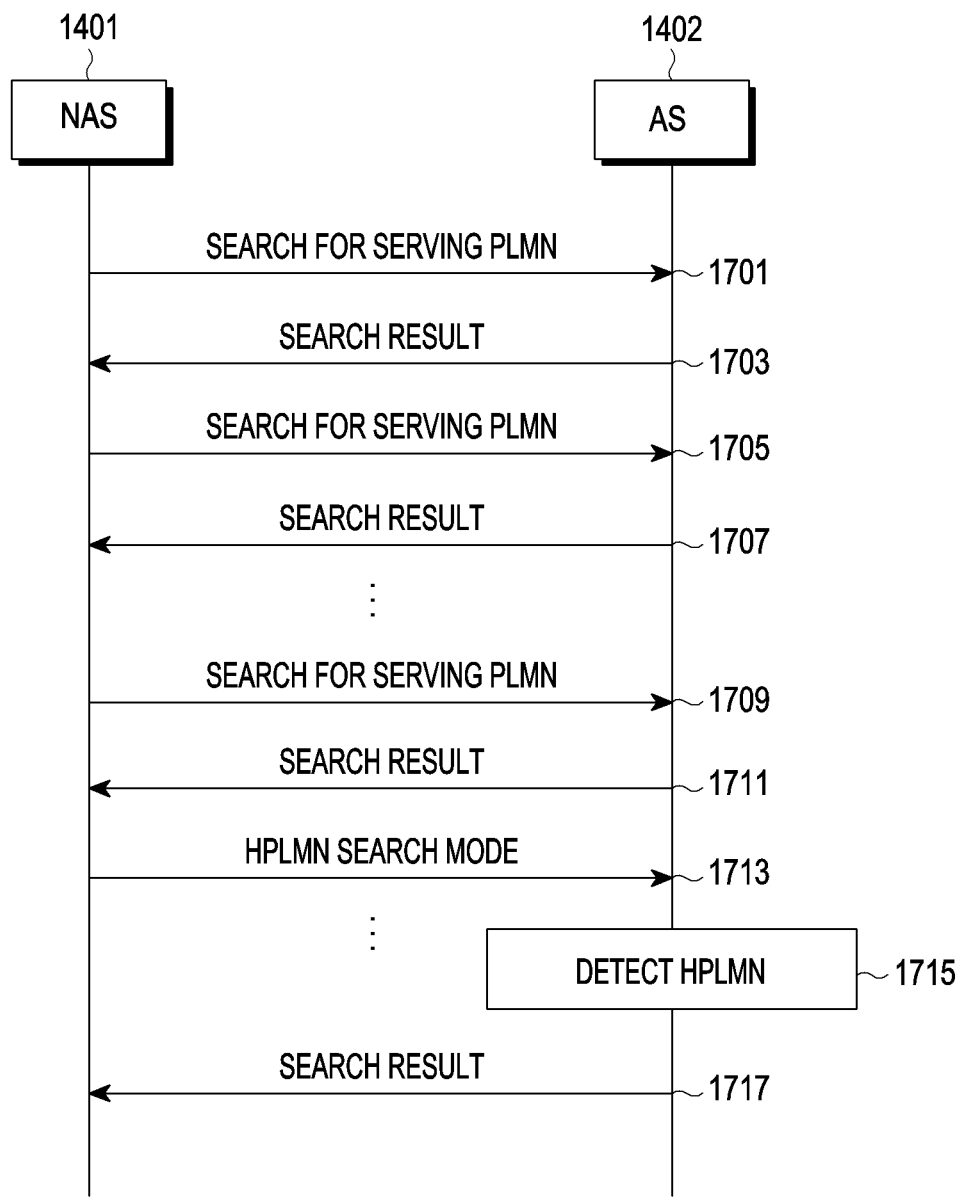
FIG. 17 is a signal flow diagram illustrating example operation of a NAS and an AS according to various embodiments.

FIG. 17 is a signal flow diagram illustrating an example operation of a NAS and an AS according to various embodiments.

In various embodiments, the NAS 1401 may request the Serving PLMN search to the AS 1402 in an inactive state in operation 1701. The AS 1402 may provide the search results to the NAS 1401 in operation 1703. In operation 1705, the NAS 1401 may request the Serving PLMN search to the AS 1402. The AS 1402 may provide the search results to the NAS 1401 in operation 1707. In operation 1709, the NAS 1401 may request the Serving PLMN search to the AS 1402. The AS 1402 may provide the search results to the NAS 1401 in operation 1711. In the embodiment of FIG. 17, the NAS 1401 may fail to detect a suitable cell and may detect an acceptable cell. The NAS 1401 may camp-on an acceptable cell, and may maintain an inactive state. The NAS 1401 may transmit a higher PLMN (HPLMN) discovery mode to the AS 1402 so that the AS 1402 performs a PLMN discovery function in the background in operation 1713. For example, the NAS 1401 may request a PLMN search in the background to the AS 1402, and the AS 1402 may search the serving PLMN in the background, based on the request. In operation 1715, the AS 1402 may detect the HPLMN. In operation 1717, the AS 1402 may transmit the search results to the NAS 1401. For example, if a suitable cell is detected before the timer (e.g., T380 timer) expires, the electronic device 101 may maintain an inactive state. For example, when the electronic device 101 re-enters the service area of a suitable cell or cannot maintain a limited service (e.g., when it is unable to search for any acceptable cell in any PLMN), the service cannot be provided. The RRC deactivation mode operation may be resumed as if not camping on any cell within the region.

Figure 18:
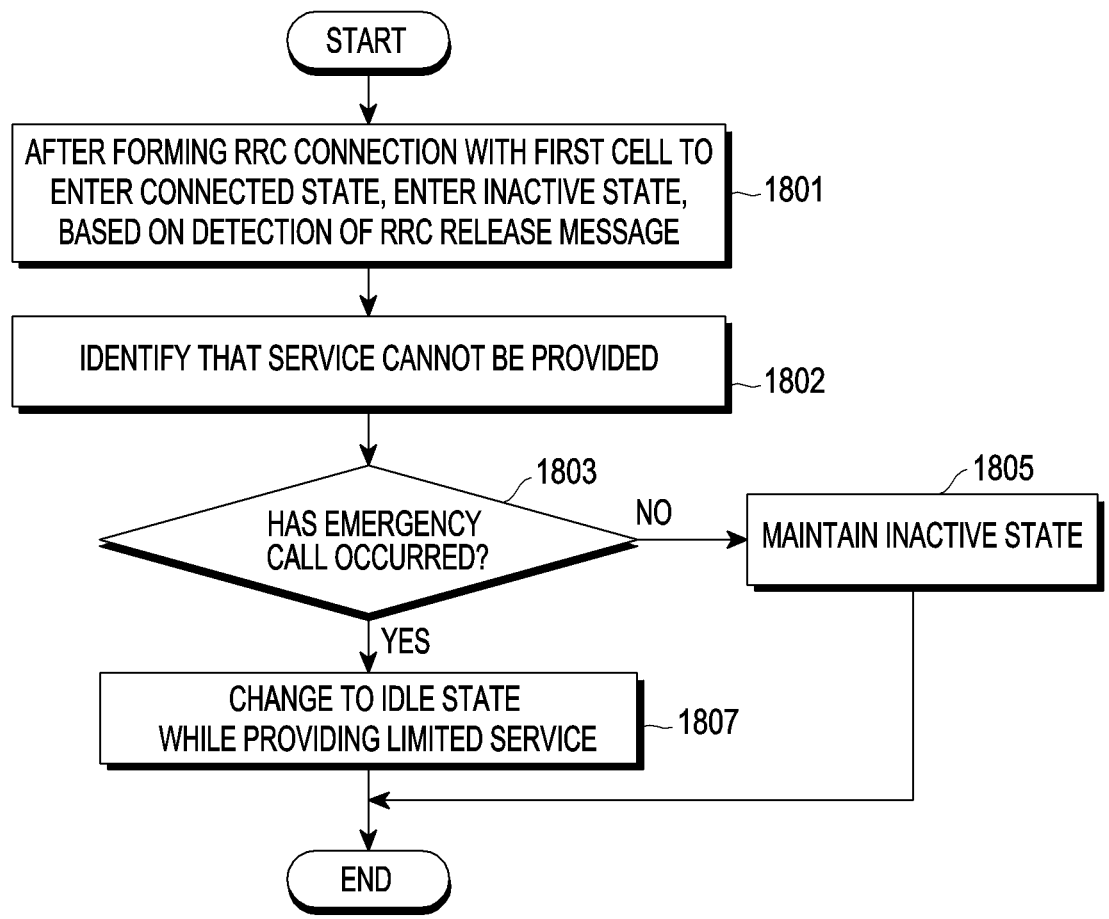
FIG. 18 is a flowchart illustrating an example method of operating an electronic device according to various embodiments.

FIG. 18 is a flowchart illustrating an example method of operating an electronic device according to various embodiments.

According to various embodiments, the electronic device 101 (e.g., at least one of the processor 120, the first communication processor 212, the second communication processor 214, or the unified communication processor 260) may, in operation 1801, enter an inactive state, based on detecting an RRC release message after entering the connected state by forming an RRC connection with the first cell. In operation 1802, the electronic device 101 may identify that the service cannot be provided after entering the inactive state. In operation 1803, the electronic device 101 may identify whether an emergency call has occurred. If it is identified that an emergency call has not occurred (1803—No), the electronic device 101 may remain inactive in operation 1805. For example, the electronic device 101 may maintain the inactive state while maintaining the camped-on state for the camped-on cell. If it is identified that an emergency call has occurred (1803—Yes), the electronic device 101 may change to the idle state while providing a limited service in operation 1807. For example, the electronic device 101 may perform a limited search for and camp-on an acceptable cell. The electronic device 101 may change from the inactive state to the idle state, based on the movement to another RAT or the transmission of a signaling message of another PLMN location registration, in addition to the occurrence of an emergency call.

According to various example embodiments, the electronic device may include: at least one communication processor configured to support at least one network communication, and the at least one communication processor may be configured to: after establishing an RRC connection with a first cell and entering the connected state, enter an inactive state based on detecting an RRC release message, and in the inactive state, identify that a service cannot be provided, perform a search until a timer started based on receiving the RRC release message expires, and maintain the inactive state based on camping-on a selected cell according to a result of the search.

According to various example embodiments, the at least one communication processor is further configured to control the electronic device to transmit an RRC resume request for synchronization with the network based on camping-on the selected cell.

According to various example embodiments, the at least one communication processor is configured to: search for a suitable cell, and camp-on the found cell, as a part of the maintaining an inactive state, based on camp-on on the selected cell according to the result of the search.

According to various example embodiments, the at least one communication processor is further configured to change the state of the electronic device from the inactive state to the idle state based on a failure of searching for the suitable cell until the timer expires.

According to various example embodiments, the at least one communication processor is further configured to perform a limited search, detect an acceptable cell during the limited search, and camp-on the acceptable cell to change to the idle state.

According to various example embodiments, the at least one communication processor is configured to perform at least one or more searches for a RAT of the cell that the electronic device has camped-on in the inactive state until the timer expires, as at least a part of the performing the search before the timer expires based on the reception of the RRC release message.

According to various example embodiments, the at least one communication processor is configured to: detect a suitable cell among at least one or more searches for the RAT of the cell that the electronic device has camped-on, camp-on the detected suitable cell, and maintain the inactive state, as at least a part of the maintaining the inactive state, based on camping-on the selected cell according to the result of the search.

According to various example embodiments, the at least one communication processor is configured to perform at least one or more searches for at least a portion of a plurality of RATs including RATs of cells that the electronic device has camped-on in the inactive state until the timer expires, as at least part of the performing the search before the timer expires, based on the reception of the RRC release message.

According to various example embodiments, the at least one communication processor is configured to: detect a suitable cell corresponding to the same RAT as the RAT of the cell that the electronic device has camped-on in the inactive state; camp-on the suitable cell corresponding to the same RAT as the RAT of the cell that the electronic device has camped-on in the inactivated state; and maintain the inactive state, as at least part of the maintaining the inactive state, based on the camping-on of the selected cell according to the result of the search.

According to various example embodiments, the at least one communication processor is further configured to: detect a suitable cell corresponding to the RAT different from the RAT of the cell that the electronic device has camped-on in the inactive state; camp-on the suitable cell corresponding to the RAT different from the RAT of the cell that the electronic device has camped-on in the inactive state; and change the state of the electronic device from the inactive state to an idle state corresponding to a RAT different from the RAT of the cell that the electronic device has camped-on.

According to various example embodiments, the at least one communication processor is further configured to: detect an acceptable cell in the inactive state; change the state of the electronic device to an idle state, based on the detected acceptable cell being identified as a cell capable of registering a location in another PLMN; and maintain the state of the electronic device in the inactive state, based on the detected acceptable cell being identified as a cell that cannot register a location in the other PLMN.

According to various example embodiments, the at least one communication processor is configured to: search for a serving PLMN in the background, and maintain the inactive state based on a suitable cell being detected as a search result of the serving PLMN in the background, as at least part of the maintaining the inactive state.

According to various example embodiments, the at least one communication processor is configured to: perform at least one first search for the RAT of the cell that the electronic device has camped-on in the inactive state until a designated event is detected; and perform at least one second search for at least one of a plurality of RATs including the RAT of the cell that the electronic device has camped-on in the inactive state until the timer expires based on the specified event being detected, as at least part of the performing the search until the timer expires.

According to various example embodiments, the designated event comprises exceeding a specified period while performing the first search or an identification of the number of times of performing the first search equal to or greater than a specified number of times.

According to various example embodiments, the at least one communication processor is configured to identify that the service cannot be provided, based on the identification of at least one of a failure of detection of a suitable cell during the specified period or a dissatisfaction of a specified condition of a signal from the cell that the electronic device has camped-on in the inactive state, as at least a part of the identifying that the service is not available, in the inactive state.

According to various example embodiments, the at least one communication processor is further configured to: identify an emergency call occurrence while maintaining the inactive state; change the state of the electronic device from the inactive state to the idle state; and provide a limited service, based on the identification of the emergency call occurrence.

According to various example embodiments, method of operating an electronic device may include: after establishing an RRC connection with a first cell and entering a connected state, and entering an inactive state, based on detecting an RRC release message; in the inactive state, identifying that a service cannot be provided; performing a search until a timer started based on receiving the RRC release message expires; and maintaining the inactive state, based on camping-on a selected cell based on a result of the search.

According to various example embodiments, the operation method of the electronic device may further include transmitting an RRC resume request for synchronization with a network, based on camping-on the selected cell.

According to various example embodiments, the performing the search until a timer started based on receiving the RRC release message expires comprises performing at least one search for a RAT of a cell that the electronic device has camped-on in the inactive state until the timer expires.

According to various example embodiments, the performing the search until a timer started based on receiving the RRC release message expires comprises performing at least one search for at least a portion of a plurality of RATs including a RAT of a cell that the electronic device has camped-on in the inactive state until the timer expires.

The electronic device according to various embodiments may be one of various types of electronic devices. The electronic devices may include, for example, and without limitation, a computer device, a portable communication device (e.g., a smartphone), a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., a master device or a task performing device). For example, a processor of the machine (e.g., a master device or a task performing device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated an described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents.

What is claimed is:

1. An electronic device comprising at least one communication processor configured to support at least one network communication,
wherein the at least one communication processor is configured to:
enter an inactive state based on detecting a radio release control (RRC) release message, after establishing an RRC connection with a first cell and entering a connected state;
identify that a service cannot be provided, in the inactive state;
perform a search until a timer started based on a reception of the RRC release message expires; and
maintain the inactive state based on camping-on a selected cell based on a result of the search.

2. The electronic device of claim 1, wherein the at least one communication processor is further configured to control the electronic device to transmit an RRC resume request for synchronization with the network based on camping-on the selected cell.

3. The electronic device of claim 1, wherein the at least one communication processor is configured to: search for a suitable cell, and camp-on the searched suitable cell, as a part of the maintaining an inactive state based on camping-on on the selected cell based on the result of the search.

4. The electronic device of claim 3, wherein the at least one communication processor is further configured to change a state of the electronic device from the inactive state to an idle state based on a failure of the searching for the suitable cell until the timer expires.

5. The electronic device of claim 4, wherein the at least one communication processor is further configured to:
perform a limited search;
detect an acceptable cell during the limited search; and
camp-on the acceptable cell to change to the idle state.

6. The electronic device of claim 1, wherein the at least one communication processor is configured to: perform at least one or more searches for a radio access technology (RAT) of a cell that the electronic device has camped-on in the inactive state until the timer expires, as at least part of the performing the search before the timer expires, based on the reception of the RRC release message.

7. The electronic device of claim 6, wherein the at least one communication processor is configured to:
detect a suitable cell among the at least one or more searches for the RAT of the cell that the electronic device has camped-on; and
camp-on the detected suitable cell and maintain the inactive state, as at least a part of the maintaining the inactive state, based on camping-on the selected cell based on the result of the search.

8. The electronic device of claim 1, wherein the at least one communication processor is configured to: perform at least one or more searches for at least a portion of a plurality of RATs including RATs of cells that the electronic device has camped-on in the inactive state until the timer expires, as at least part of the performing the search before the timer expires, based on the reception of the RRC release message.

9. The electronic device of claim 8, wherein the at least one communication processor is configured to:
detect a suitable cell corresponding to a same RAT as the RAT of the cell that the electronic device has camped-on in the inactive state;
camp-on the suitable cell corresponding to the same RAT as the RAT of the cell that the electronic device has camped-on in the inactivated state; and
maintain the inactive state, as at least part of the maintaining the inactive state, based on the camping-on of the selected cell based on the result of the search.

10. The electronic device of claim 8, wherein the at least one communication processor is further configured to:
detect a suitable cell corresponding to a RAT different from the RAT of the cell that the electronic device has camped-on in the inactive state;
camp-on the suitable cell corresponding to the RAT different from the RAT of the cell that the electronic device has camped-on in the inactive state; and
change the state of the electronic device from the inactive state to an idle state corresponding to a RAT different from the RAT of the cell that the electronic device has camped-on.

11. The electronic device of claim 8, wherein the at least one communication processor is further configured to:
detect an acceptable cell in the inactivated state;
change the state of the electronic device to an idle state based on the detected acceptable cell being identified as a cell capable of registering a location in another public land mobile network (PLMN); and maintain the state of the electronic device in the inactivated state, based on the detected acceptable cell being identified as a cell that cannot register a location in the other PLMN.

12. The electronic device of claim 11, wherein the at least one communication processor is configured to: search for a serving PLMN in the background, and maintain the inactive state based on a suitable cell being detected as a search result of the serving PLMN in the background, as at least part of the maintaining the inactive state.

13. The electronic device of claim 1, wherein the at least one communication processor is configured to:

perform at least one first search for the RAT of the cell that the electronic device has camped-on in the inactive state until a designated event is detected; and perform at least one second search for at least one of a plurality of RATs including the RAT of the cell that the electronic device has camped-on in the inactive state until the timer expires based on the specified event being detected, as at least part of the performing the search until the timer expires.

14. The electronic device of claim 13, wherein the designated event comprises exceeding a specified period while performing the first search or an identification of the number of times of performing the first search being equal to or greater than a specified number of times.

15. The electronic device of claim 1, wherein the at least one communication processor is configured to: identify that the service cannot be provided based on the identification of at least one of a failure of detection of a suitable cell during the specified period or a dissatisfaction of a specified condition of a signal from the cell that the electronic device has camped-on in the inactive state, as at least a part of the identifying that the service is not available, in the inactive state.

16. The electronic device of claim 1, wherein the at least one communication processor is further configured to:

identify an emergency call occurrence while maintaining the inactive state;

change the state of the electronic device from the inactive state to the idle state; and provide a limited service based on the identification of the emergency call occurrence.

17. A method of operating an electronic device, comprising:

entering, by the electronic device, an inactive state based on detecting a radio release control (RRC) release message, after establishing, by the electronic device, a radio resource control (RRC) connection with a first cell and entering a connected state;

in the inactive state, identifying that a service cannot be provided;

performing a search until a timer started based on receiving the RRC release message expires; and maintaining the inactive state based on camping-on a selected cell based on a result of the search.

18. The method of claim 17, further comprising transmitting, by the electronic device, an RRC resume request for synchronization with a network based on camp-on the selected cell.

19. The method of claim 17, wherein performing the search until the timer started based on receiving the RRC release message expires comprises: performing, by the electronic device, at least one search for a radio access technology (RAT) of a cell that the electronic device has camped-on in the inactive state until the timer expires.

20. The method of claim 17, wherein performing the search until the timer started based on receiving the RRC release message expires comprises performing, by the electronic device, at least one search for at least a portion of a plurality of RATs including a RAT of a cell that the electronic device has camped-on in the inactive state until the timer expires.

* * * * *